(12) United States Patent
Yamamura

(10) Patent No.: US 10,185,152 B2
(45) Date of Patent: Jan. 22, 2019

(54) VEHICLE DISPLAY DEVICE

(71) Applicant: NIPPON SEIKI CO., LTD., Niigata (JP)

(72) Inventor: Ayako Yamamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 15/744,745

(22) PCT Filed: Jul. 26, 2016

(86) PCT No.: PCT/JP2016/071798
§ 371 (c)(1),
(2) Date: Jan. 12, 2018

(87) PCT Pub. No.: WO2017/018400
PCT Pub. Date: Feb. 2, 2017

(65) Prior Publication Data
US 2018/0210210 A1 Jul. 26, 2018

(30) Foreign Application Priority Data
Jul. 27, 2015 (JP) .................................. 2015-147996

(51) Int. Cl.
*G02B 27/01* (2006.01)
*B60K 35/00* (2006.01)
(Continued)

(52) U.S. Cl.
CPC .......... *G02B 27/0179* (2013.01); *B60K 35/00* (2013.01); *B60R 1/001* (2013.01);
(Continued)

(58) Field of Classification Search
CPC ............ G02B 27/0179; G02B 27/0101; G02B 2027/014; G02B 2027/0181;
(Continued)

(56) References Cited

U.S. PATENT DOCUMENTS 7,519,471 B2 * 4/2009 Shibata ................ G01C 21/365
340/425.5
9,047,703 B2 * 6/2015 Beckwith ................ G06T 15/08
(Continued)

FOREIGN PATENT DOCUMENTS

JP      07-144557 A    6/1995
JP      11-314538 A    11/1999
(Continued)

OTHER PUBLICATIONS

International Search Report issued in corresponding International Patent Application No. PCT/JP2016/071798, dated Aug. 30, 2016.

*Primary Examiner* — Abderrahim Merouan
(74) *Attorney, Agent, or Firm* — McDermott Will & Emery LLP

(57) ABSTRACT

A vehicle display device includes: a viewpoint position acquisition unit acquiring a user viewpoint position of a user seated in a driver seat of a vehicle; a forward information acquisition unit acquiring forward information of the vehicle; an image generation unit generating an image obtained by reflecting the forward information included within a prescribed area among the forward information acquired by the forward information acquisition unit; an image display unit having a display surface capable of displaying the image generated; and a projection unit projecting the image toward a vehicle's translucent member such that a virtual image is visible to the user. The image generation unit determines the position and the size of a first image element to be displayed, among image elements included in the generated image, on the display surface, according to the user viewpoint position in the vertical direction acquired by the viewpoint position acquisition unit.

10 Claims, 15 Drawing Sheets

(51) Int. Cl.
    *H04N 13/366*     (2018.01)
    *B60R 1/00*     (2006.01)
    *G06T 11/60*     (2006.01)

(52) U.S. Cl.
    CPC .......... *G02B 27/0101* (2013.01); *G06T 11/60* (2013.01); *H04N 13/366* (2018.05); *B60R 2300/205* (2013.01); *B60R 2300/308* (2013.01); *G02B 2027/014* (2013.01); *G02B 2027/0181* (2013.01); *G02B 2027/0187* (2013.01)

(58) Field of Classification Search
    CPC .......... G02B 2027/0187; H04N 13/366; B60R 1/001; B60R 2300/205; B60R 2300/308; G06T 11/60
    See application file for complete search history.

(56) References Cited

U.S. PATENT DOCUMENTS

| | | | | |
|---|---|---|---|---|
| 9,251,715 | B2* | 2/2016 | Hing | G02B 27/01 |
| 9,405,120 | B2* | 8/2016 | Graf | G02B 27/0149 |
| 2006/0262140 | A1* | 11/2006 | Kujawa | G06T 19/006 |
| | | | | 345/633 |
| 2011/0227717 | A1* | 9/2011 | Kumon | G02B 27/01 |
| | | | | 340/441 |
| 2012/0050138 | A1* | 3/2012 | Sato | B60K 35/00 |
| | | | | 345/4 |
| 2012/0154441 | A1* | 6/2012 | Kim | G06K 9/00832 |
| | | | | 345/633 |
| 2012/0224062 | A1* | 9/2012 | Lacoste | G01C 21/365 |
| | | | | 348/148 |
| 2012/0268351 | A1* | 10/2012 | Sasaki | G01C 21/365 |
| | | | | 345/8 |
| 2013/0201335 | A1* | 8/2013 | Heinemann | H04N 5/262 |
| | | | | 348/148 |
| 2014/0063064 | A1* | 3/2014 | Seo | G08G 1/166 |
| | | | | 345/633 |
| 2014/0267398 | A1* | 9/2014 | Beckwith | G08G 1/166 |
| | | | | 345/633 |

FOREIGN PATENT DOCUMENTS

| | | |
|---|---|---|
| JP | 2008-296701 A | 12/2008 |
| JP | 2012-006469 A | 1/2012 |
| JP | 2012-035745 A | 2/2012 |
| JP | 2012-153256 A | 8/2012 |
| JP | 2014-210537 A | 11/2014 |
| WO | 2014/061138 A1 | 4/2014 |

\* cited by examiner

[Fig.1A]
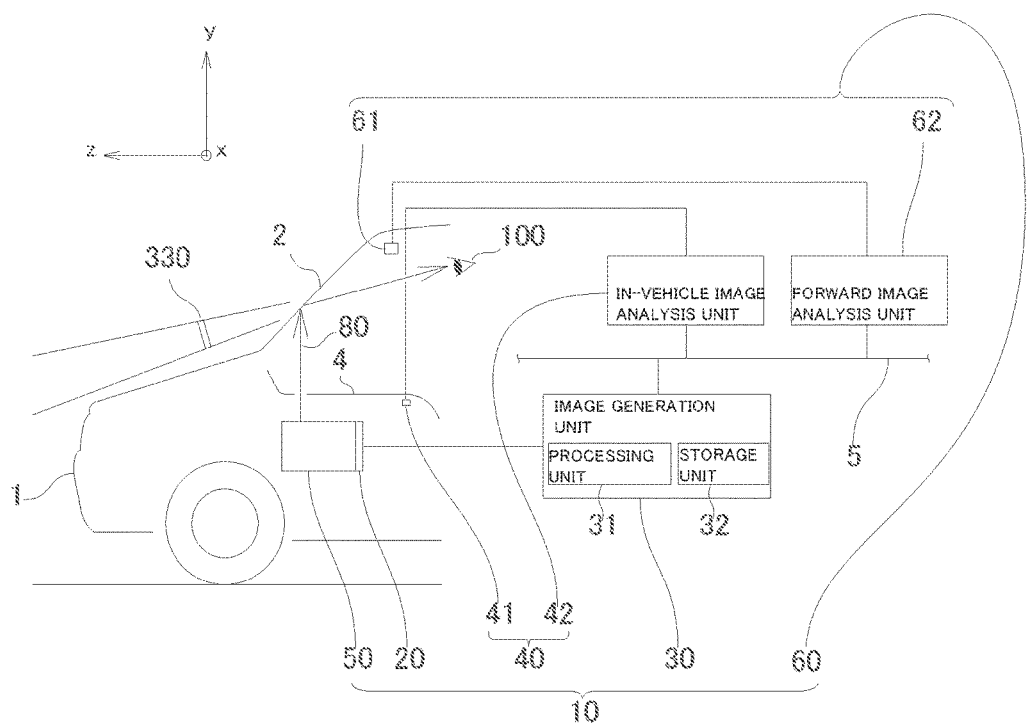
[Fig.1B]
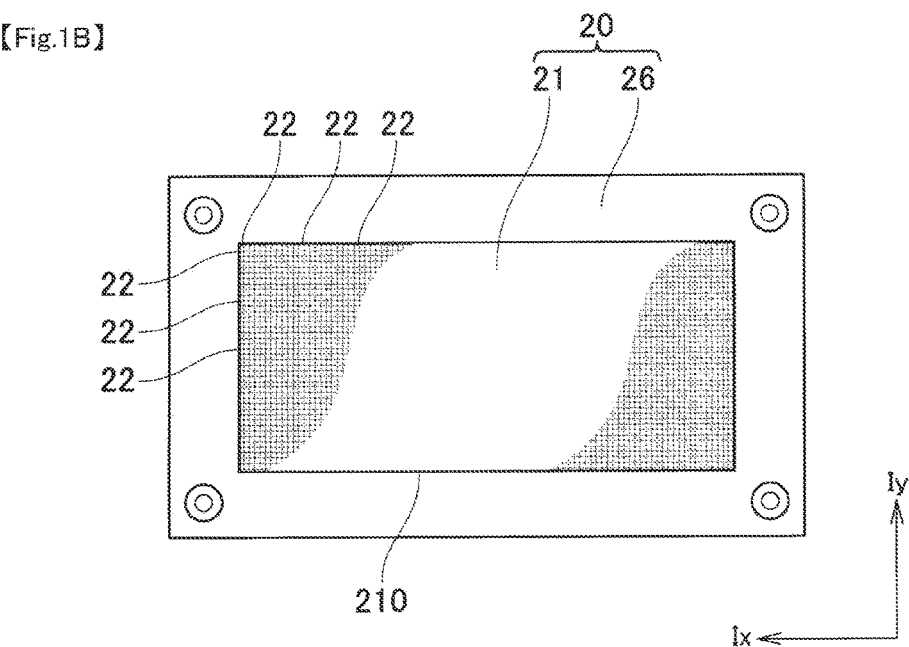

[Fig.1C]
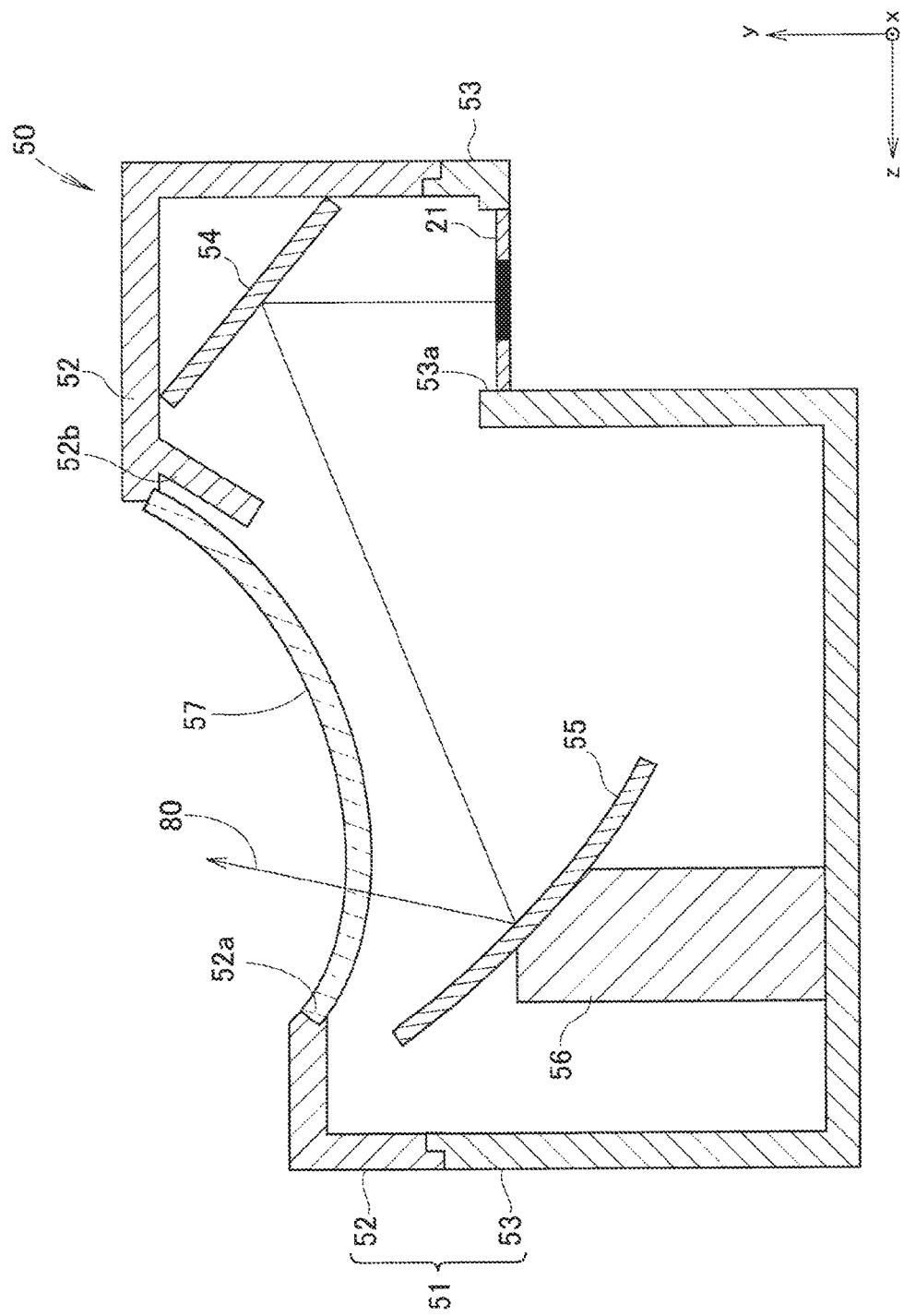

[Fig.2]
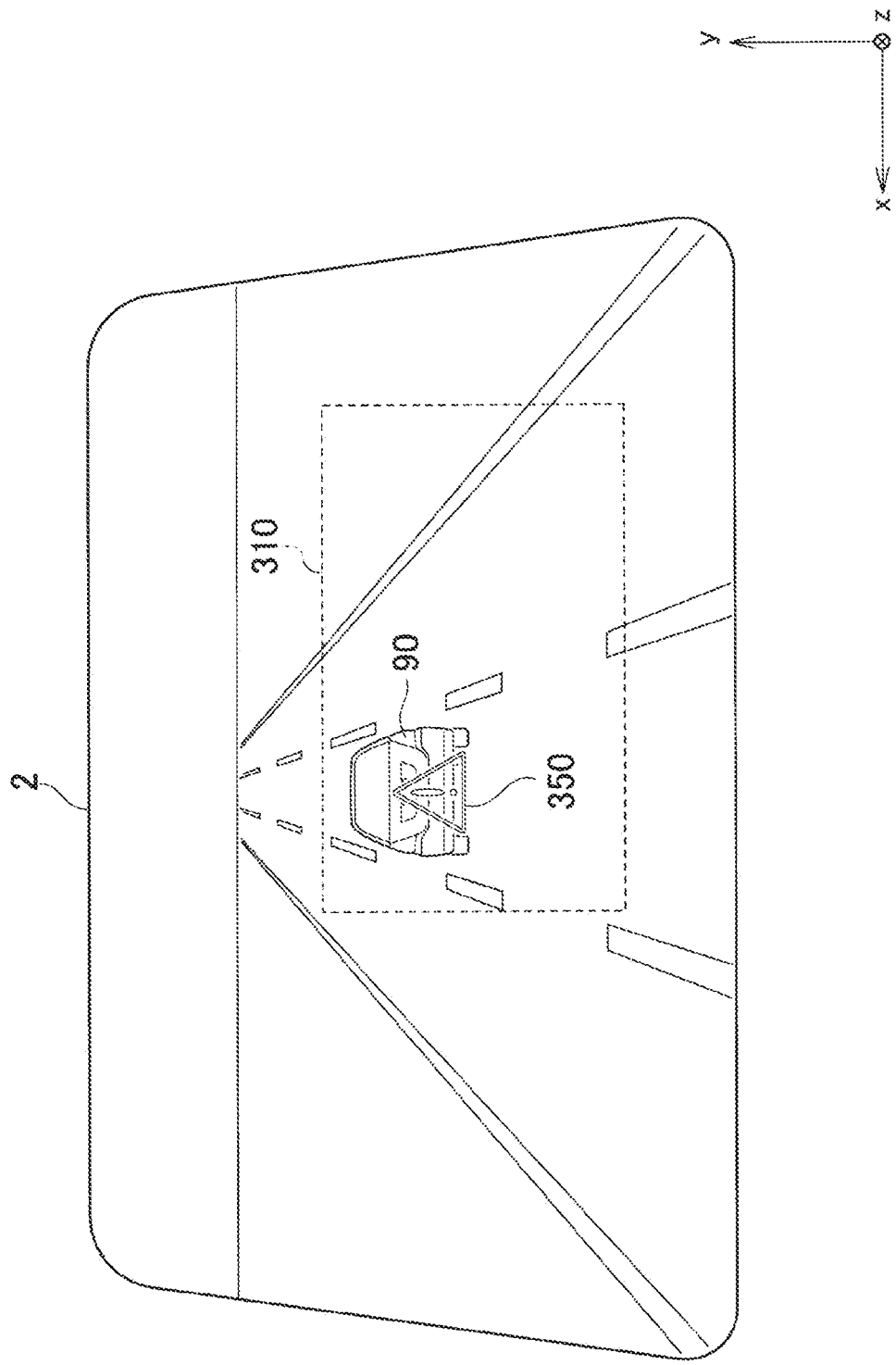

[Fig.3]
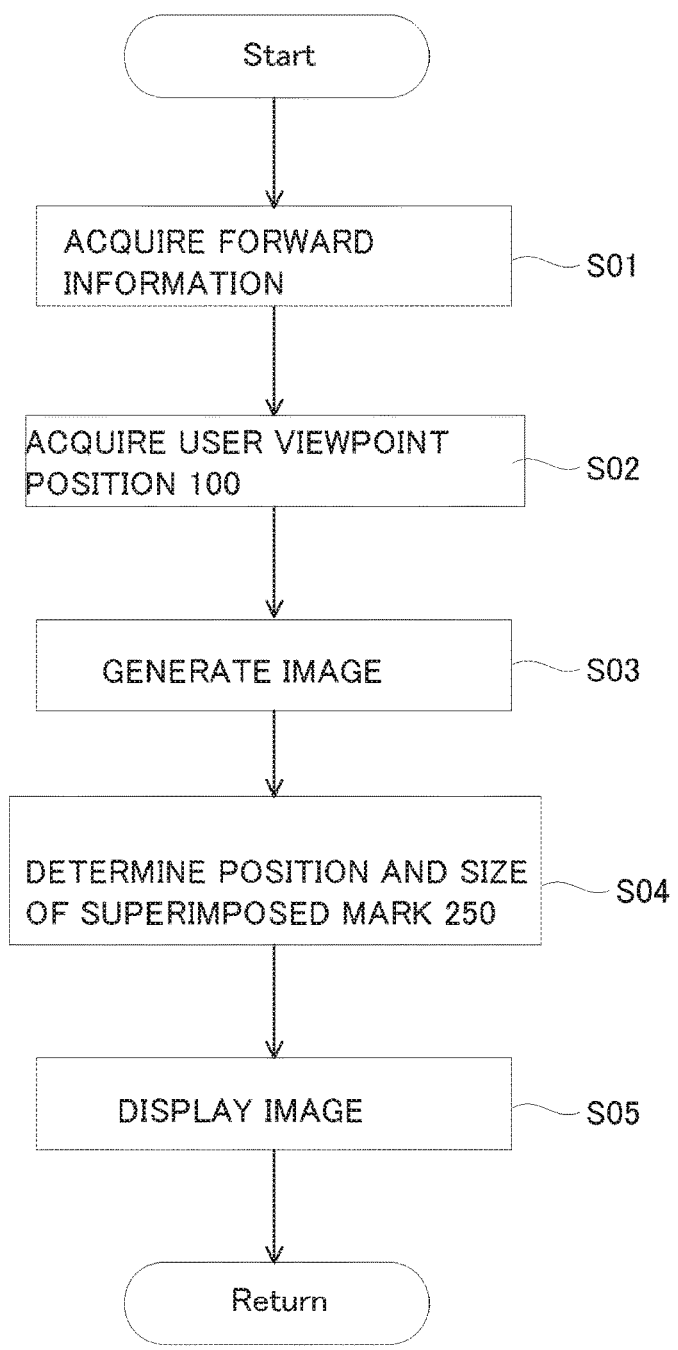

[Fig.4A]
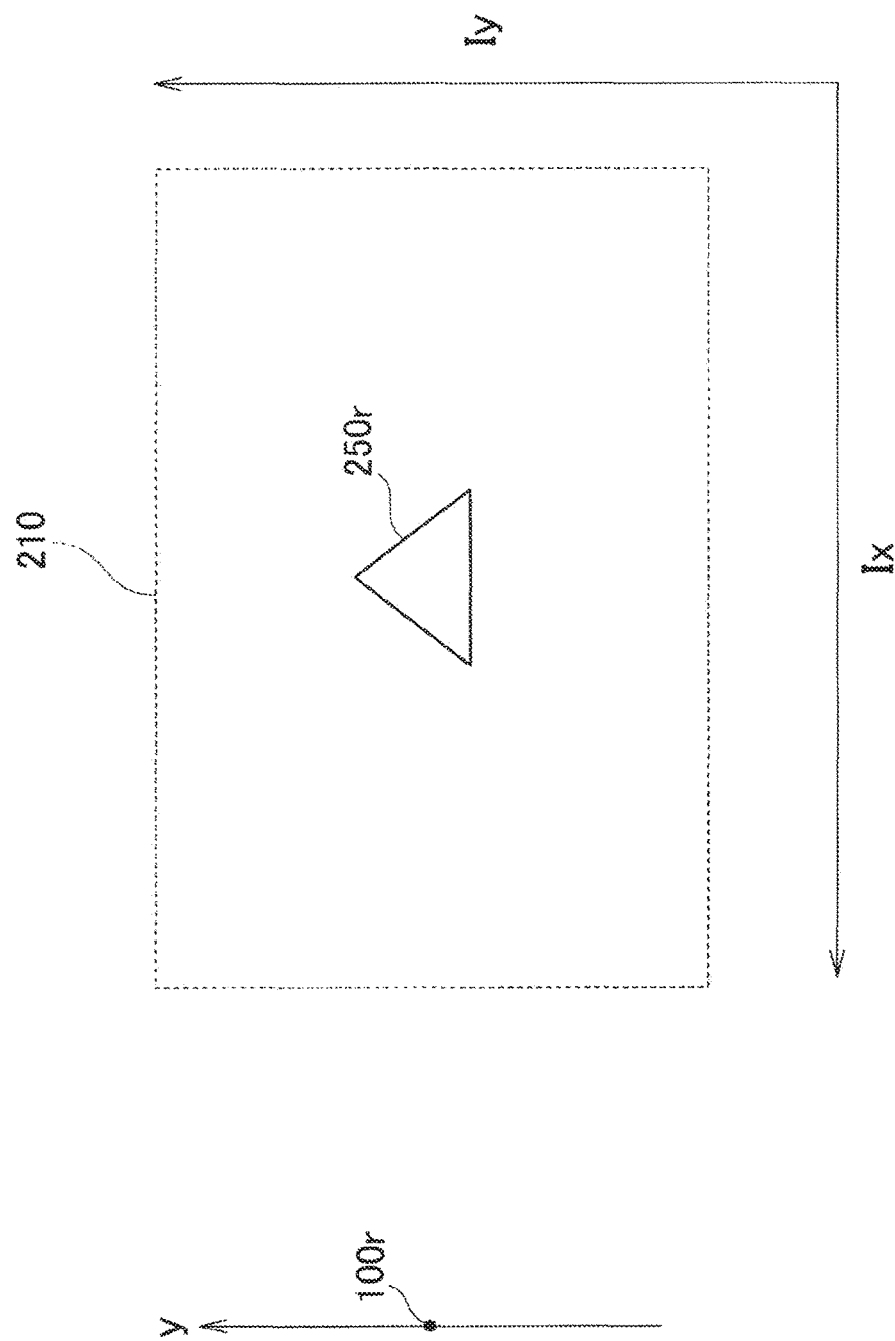

[Fig.4B]
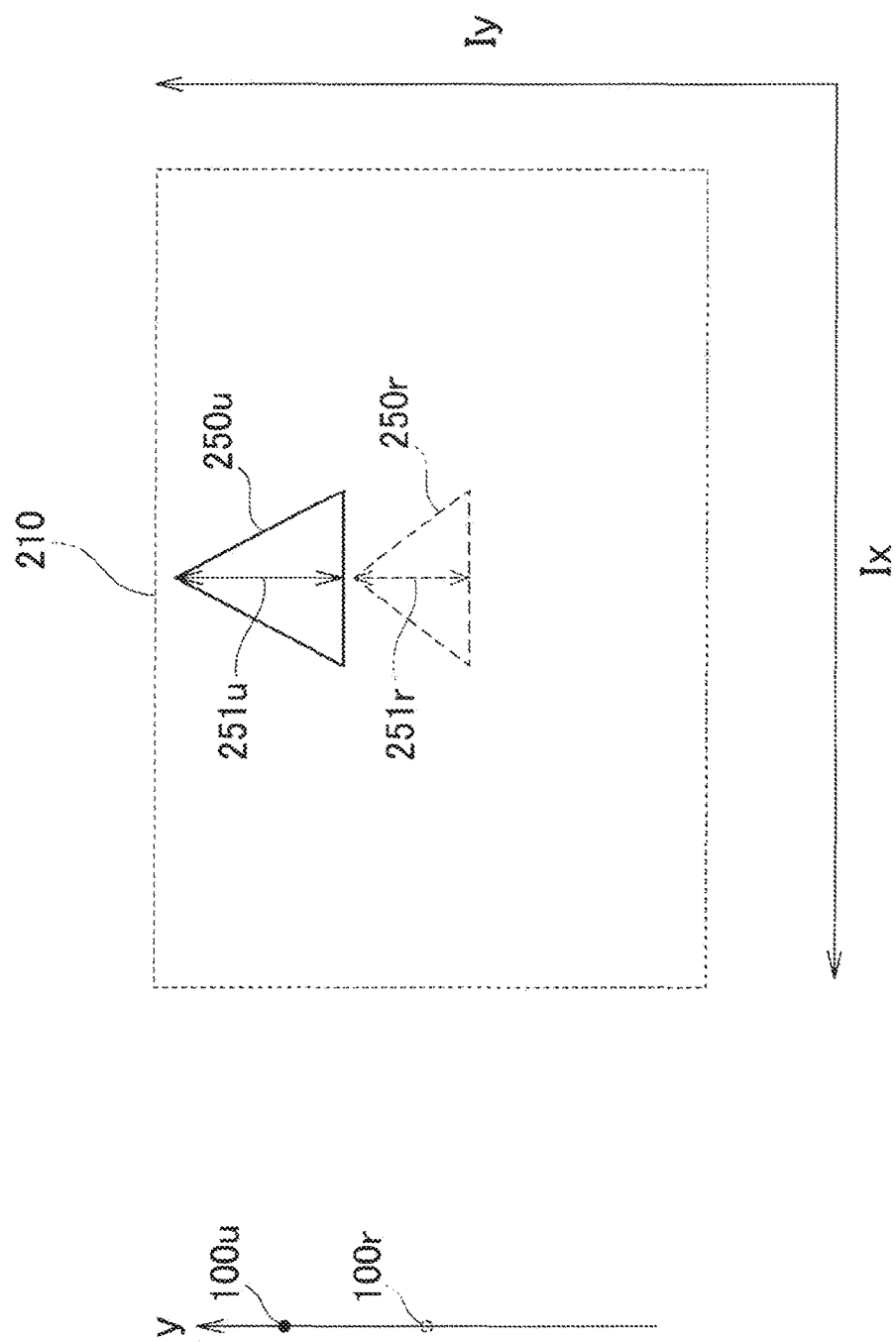

[Fig.4C]
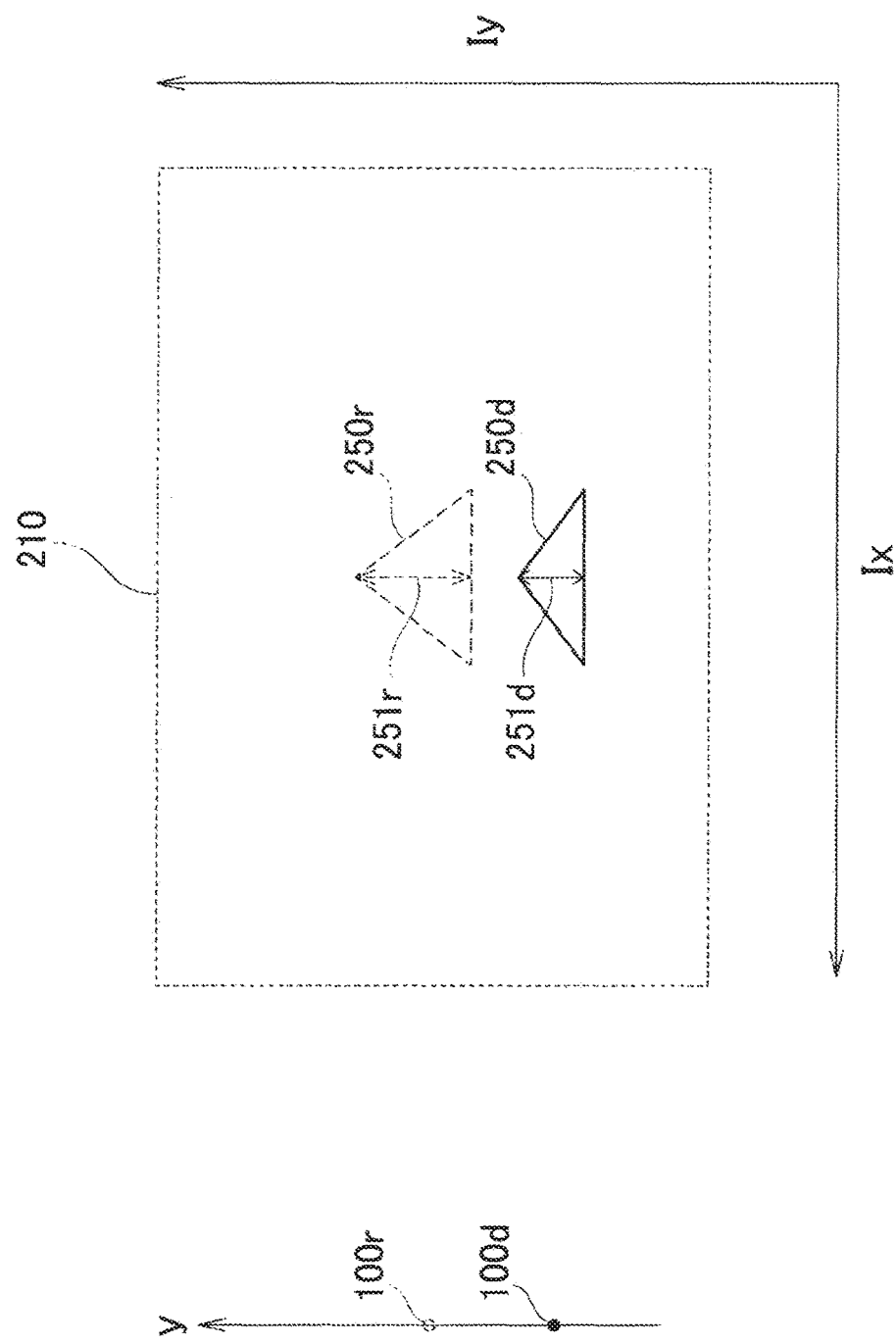

[Fig.5]
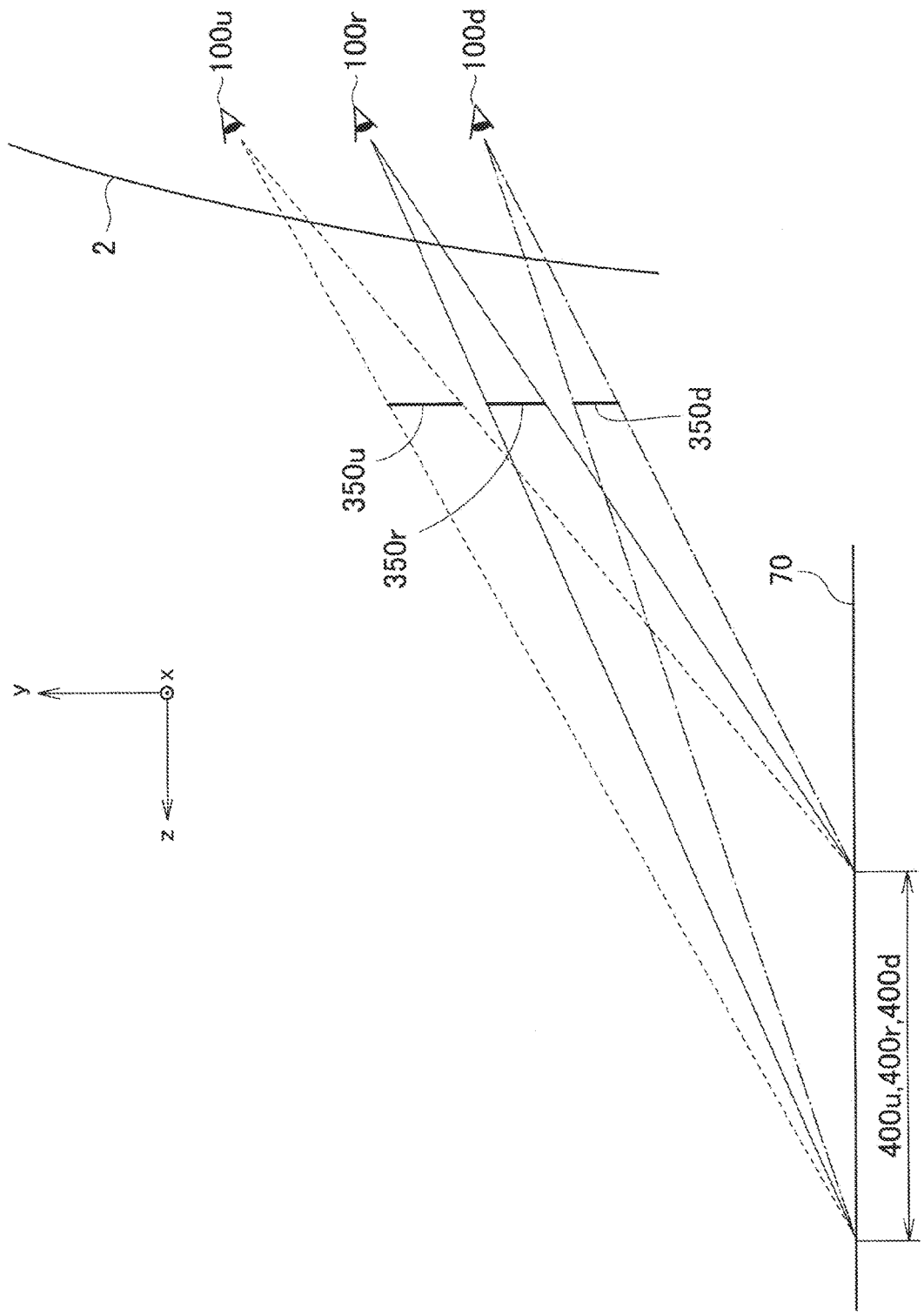

[Fig.6]
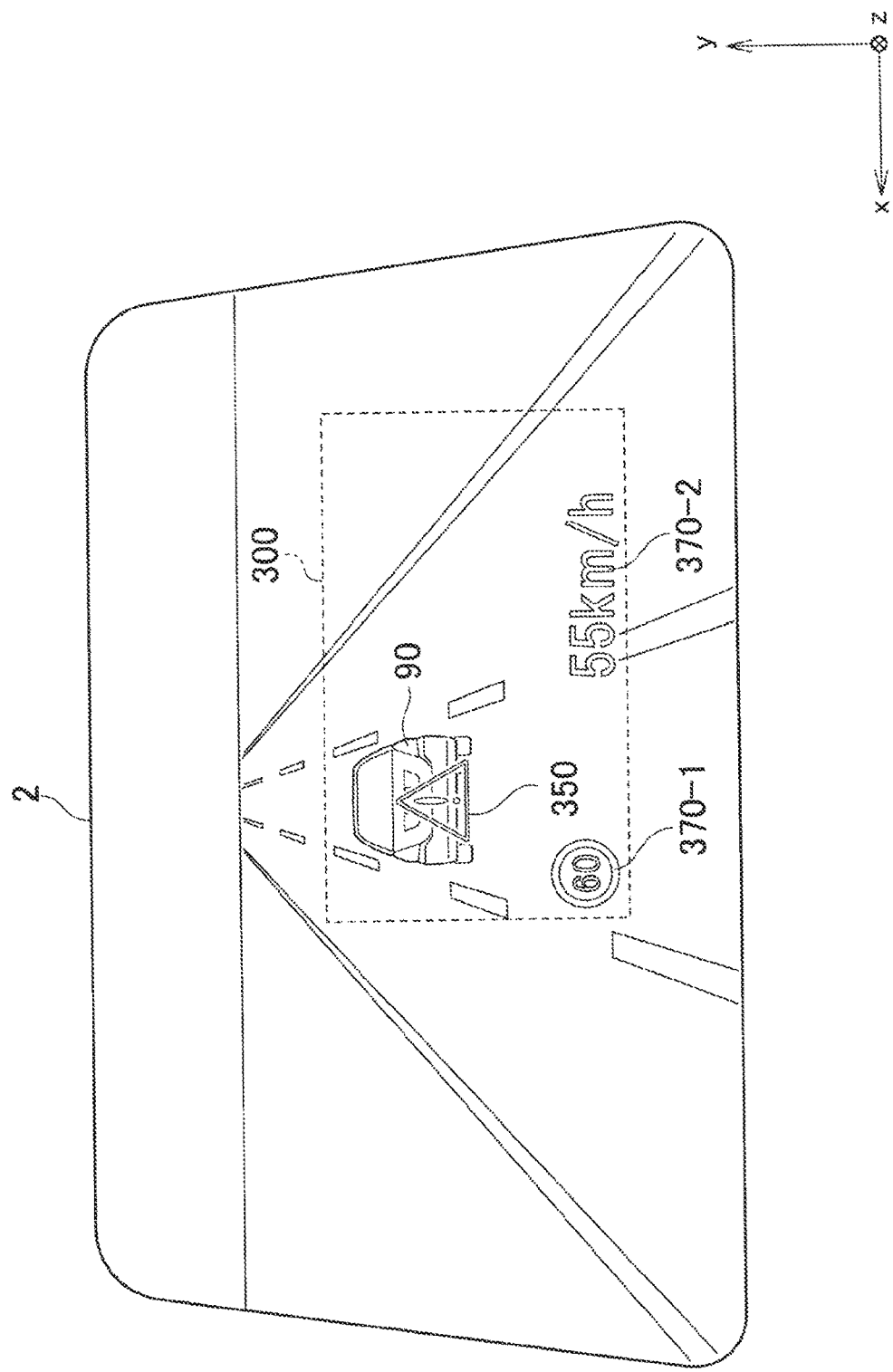

[Fig.7]
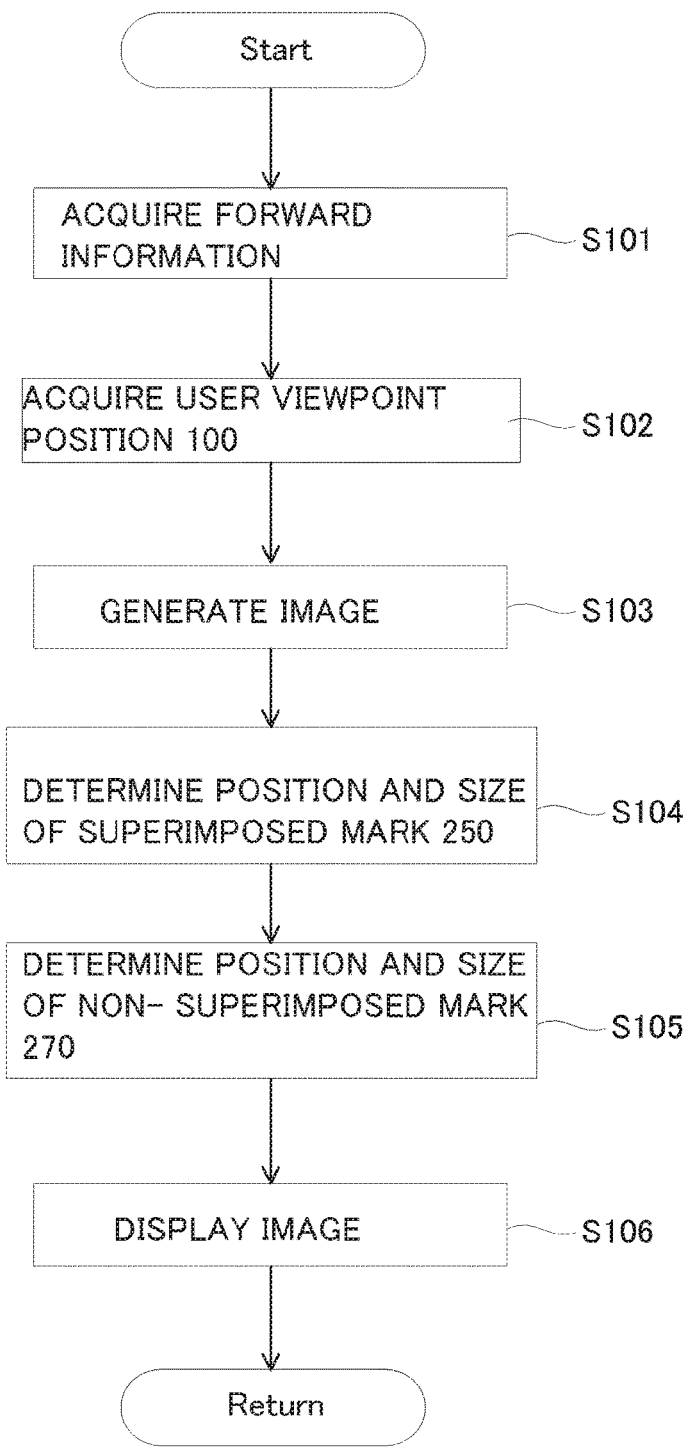

[Fig.8]
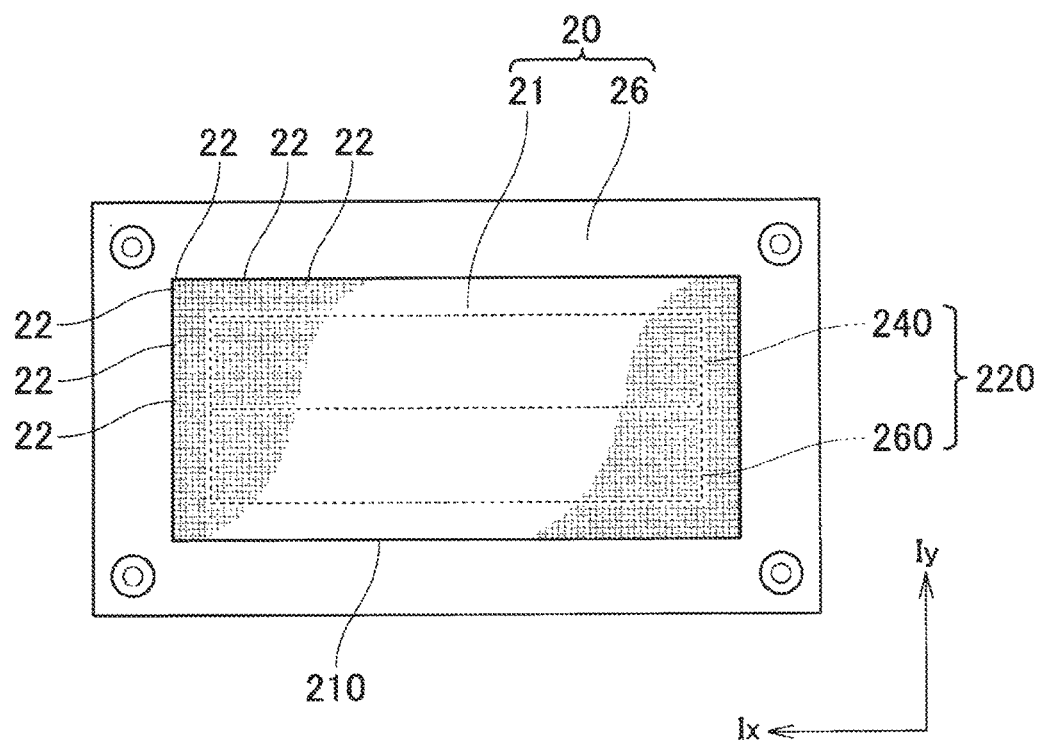

[Fig.9]
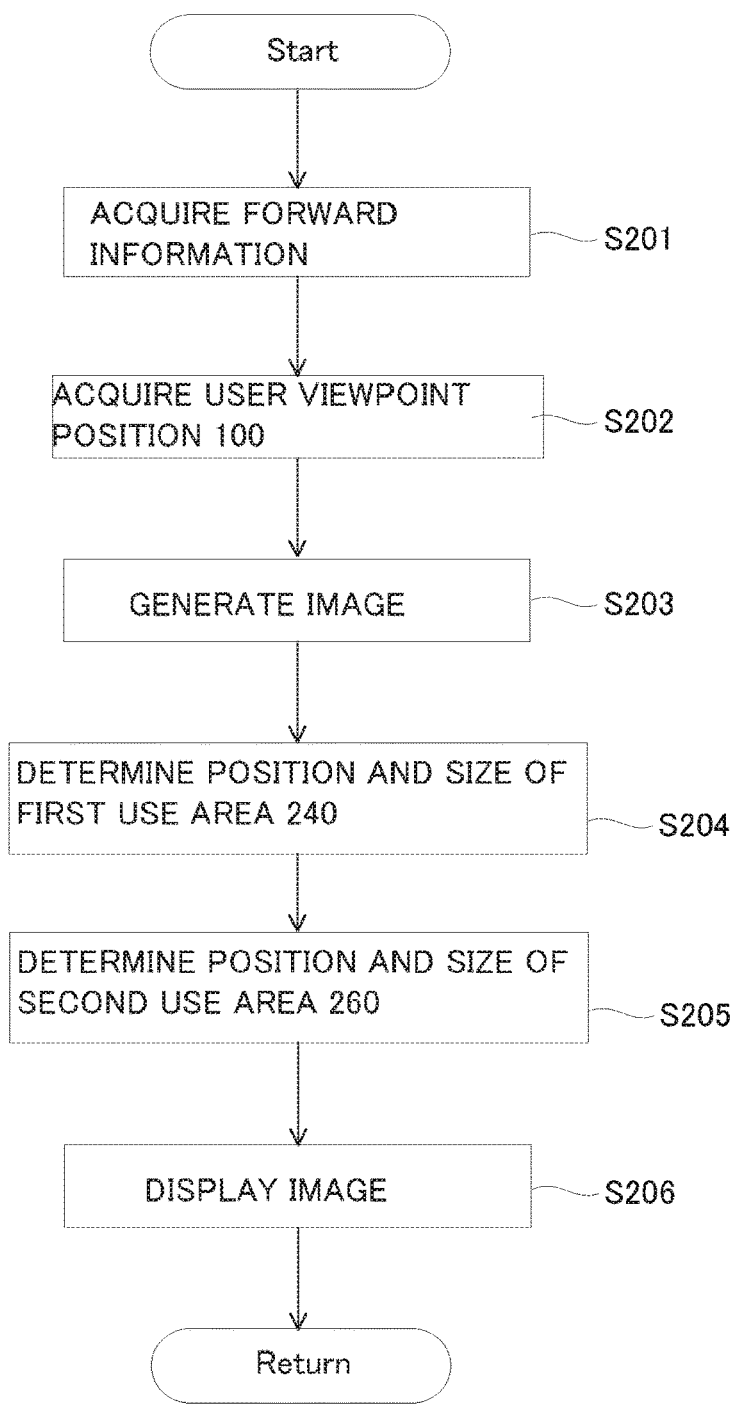

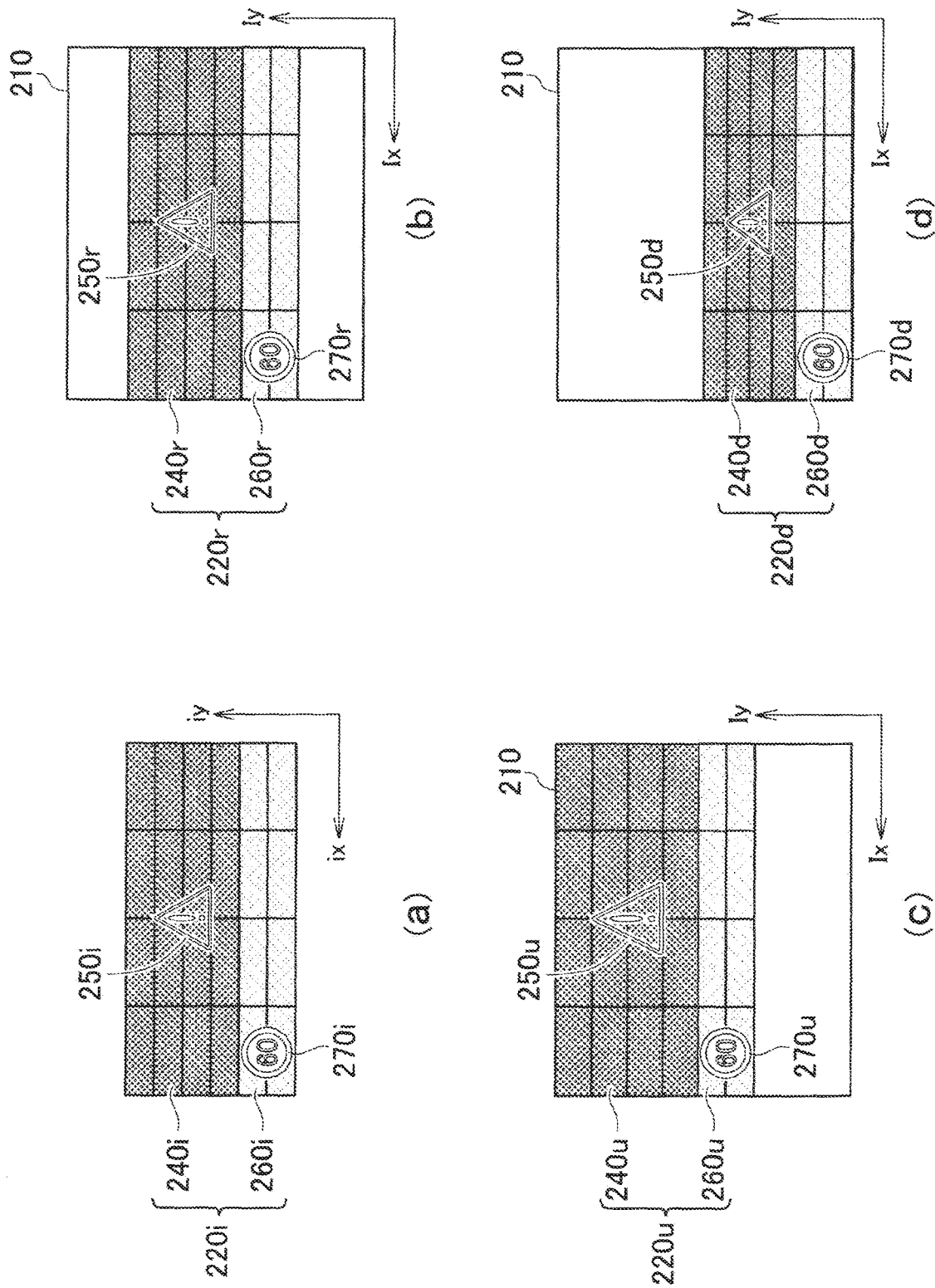
[Fig.10]

[Fig.11]
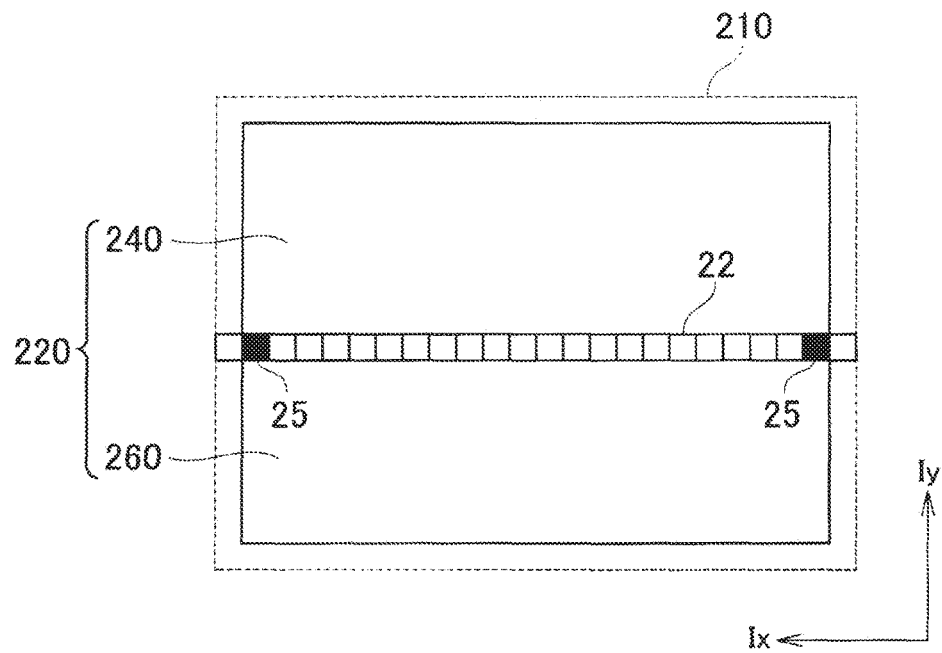
[Fig.12]
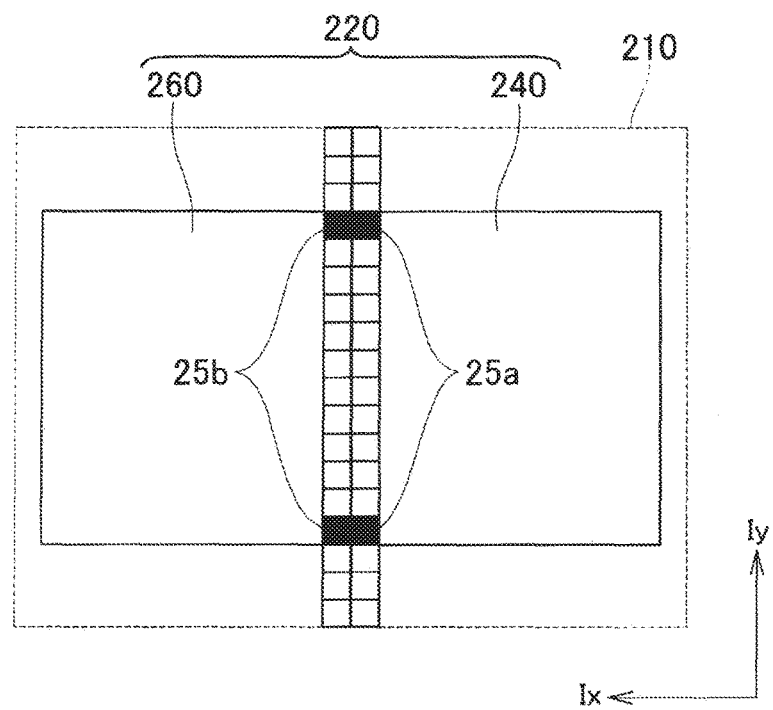

[Fig.13]
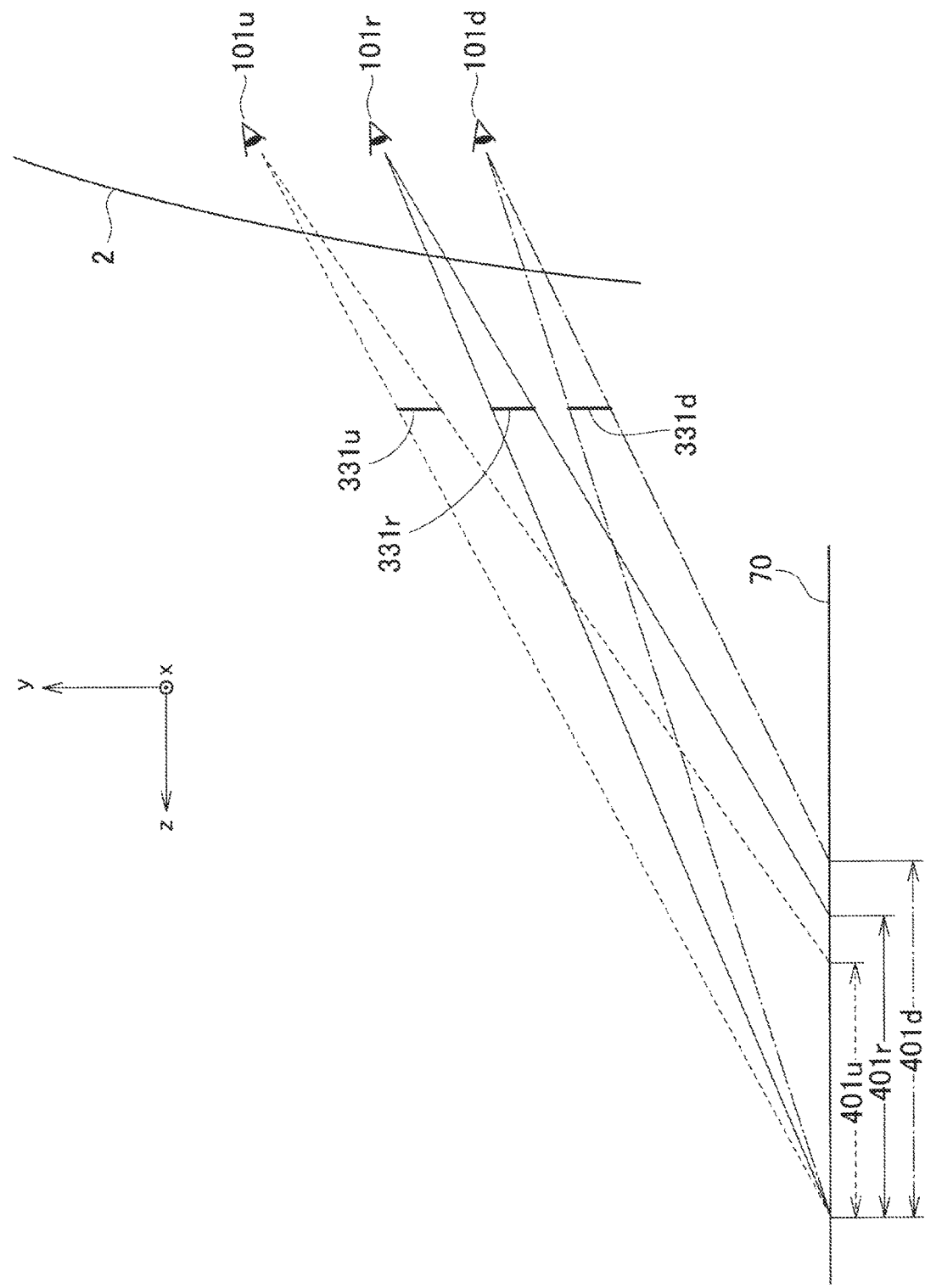

VEHICLE DISPLAY DEVICE

CROSS REFERENCE

This application is the U.S. National Phase under 35 U.S.C. § 371 of International Application No. PCT/JP2016/071798, filed on Jul. 26, 2016, which claims the benefit of Japanese Application No. 2015-147996, filed on Jul. 27, 2015, the entire contents of each are hereby incorporated by reference.

TECHNICAL FIELD

The present invention relates to a vehicle display device. More particularly, the present invention relates to a vehicle display device capable of providing appropriate information to a user without being affected by a change in a viewpoint position of a user.

BACKGROUND ART

As a vehicle display device, there is a so-called head-up display, which allows a user sitting in a driver seat to visually recognize a virtual image by projecting a display image on a translucent member such as a front windshield of a vehicle and using the light of a display image reflected by the front windshield. In such a vehicle display device, a virtual image is visually recognized by a user sitting in a driver seat so that a virtual image is formed on a vehicle traveling direction side (vehicle front side) with respect to a front windshield of a vehicle. A general configuration of such a vehicle display device includes, for example, an image display unit for displaying a display image, a projection unit constituted by an optical system, including a concave mirror for projecting a display image onto a front windshield of a vehicle.

A user sitting in a driver seat of a vehicle equipped with such a vehicle display device is able to visually recognize a virtual image, giving information, for example, on the presence of other vehicles, obstacles, etc. on a road in front of the vehicle in a state superimposed on a scenery seen through a front windshield. As a position at which the virtual image is visually recognized moves upward in a vertical direction of the front windshield, the virtual image is viewed superimposed on a scene of a far side of the scenery seen through the front windshield. On the other hand, as a position at which the virtual image is visually recognized moves downward in a vertical direction of the front windshield, the virtual image is viewed superimposed on a scene of a near side of the scenery seen through the front windshield.

Here, the viewpoint position of the user sitting in the driver seat is not constant depending on the sitting height and seated posture of the user, and the likes. For example, when the position at which the display image is projected is fixed, as the viewpoint position of the user sitting in the driver seat becomes higher, the virtual image is superimposed on the scene of the near side of the scenery seen through the front windshield. Thus, as the viewpoint position of the user sitting in the driver seat changes, an object in the scenery where the virtual image is superimposed deviates, causing a possibility of giving an uncomfortable feeling to the user.

Therefore, for example, Patent Literature 1 discloses a head-up display device (vehicle display device), which adjusts a projection direction of an optical system, including a concave mirror of a projection unit, in accordance with a position in a vertical direction of a viewpoint of a user sitting in a driver seat of a vehicle. The vehicle display device disclosed in Patent Literature 1 includes a concave mirror actuator that adjusts a projection angle of a concave mirror of a projection unit, and a viewpoint detection camera that acquires a position of a viewpoint of a user sitting in a driver seat of a vehicle.

In the vehicle display device disclosed in Patent Literature 1, the concave mirror actuator is controlled such that a display image is projected upward in a vertical direction of a front windshield when the viewpoint position of the user sitting in the driver seat of the vehicle acquired by the viewpoint detection camera is high. On the other hand, in the vehicle display device disclosed in Patent Literature 1, the concave mirror actuator is controlled such that a display image is projected downward in a vertical direction of a front windshield when the viewpoint position of the user sitting in the driver seat of the vehicle acquired by the viewpoint detection camera is low. Therefore, in the vehicle display device disclosed in Patent Literature 1, even when the viewpoint position of a user sitting in a driver seat of a vehicle changes, it is possible to prevent a great displacement of an object superimposed with a virtual image in the scenery seen through the front windshield.

CITATION LIST

Patent Literature

Patent Literature 1: Japanese Unexamined Patent Application Publication No. 2014-210537

SUMMARY OF THE INVENTION

Problems to be Solved by the Invention

However, the inventor of the present invention has recognized that the vehicle display device disclosed in Patent Literature 1 has a possibility of giving an uncomfortable feeling to a user when a position of a viewpoint of the user changes. This point will be described below with reference to FIG. 13. FIG. 13 explains the relationship between the viewpoint position of the user, the virtual image viewed by the user, and the range of the distance on the road surface of the scenery where the virtual image is superimposed, in the vehicle display device described in Patent Literature 1. In FIG. 13, the amount of change in the viewpoint position of the user is shown exaggerated to clearly explain the relationship between the viewpoint position of the user in the vertical direction, the virtual image viewed by the user, and the range of the distance on the road surface of the scenery where the virtual image is superimposed. Specifically, the distance in the vertical direction between the user viewpoint position $101\ u$, the user viewpoint position $101\ r$, and the user viewpoint position $101\ d$ shown in FIG. 13 is actually closer than the example shown in FIG. 13. In addition, in the coordinate axes shown in FIG. 13, the positive direction of the z-axis represents the front direction of the vehicle, the positive direction of the y-axis represents the upper side of the vertical direction, and the positive direction of the x-axis (the direction vertical to the drawing) represents the left direction of the vehicle.

FIG. 13 shows the positions of three viewpoints of the user, a viewpoint position $101\ u$, a user viewpoint position $101\ r$, and a user viewpoint position $101\ d$, as an example of the position of the viewpoint of the user sitting in the driver seat of the vehicle. The virtual image $331\ u$ shown in FIG.

13 is is a virtual image to be visually recognized by the user as a result of adjusting a projection angle of a display image by the vehicle display device described in Patent Literature 1, for example, when the viewpoint of the user sitting in the driver seat of the vehicle is the user viewpoint position 101 $u$. The virtual image 331 $r$ shown in FIG. 13 is a virtual image to be visually recognized by the user as a result of adjusting a projection angle of a display image by the vehicle display device described in Patent Literature 1, for example, when the viewpoint of the user sitting in the driver seat of the vehicle is the user viewpoint position 101 $r$. The virtual image 331 $d$ shown in FIG. 13 is a virtual image to be visually recognized by the user as a result of adjusting a projection angle of a display image by the vehicle display device described in Patent Literature 1, for example, when the viewpoint of the user sitting in the driver seat of the vehicle is the user viewpoint position 101 $d$. In the vehicle display device disclosed in Patent Literature 1, when the position of the viewpoint of the user sitting in the driver seat of the vehicle changes, the direction in which the display image is projected is changed. For example, the display image itself displayed by the display unit (image display unit) is not changed. Therefore, the sizes of the virtual image 331 $u$, the virtual image 331 $r$, and the virtual image 331 $d$ in the vertical direction are all the same.

The superimposed distance range 401 $u$ shown in FIG. 13 is a range on the road surface 70 of the scene in the scenery seen through the front windshield 2 where the virtual image 331 $u$ is superimposed, for example, when the viewpoint of the user sitting in a driver seat of a vehicle is the user viewpoint position 101 $u$. The superimposed distance range 401 $r$ shown in FIG. 13 is a range on the road surface 70 of the scene in the scenery seen through the front windshield 2 where the virtual image 331 $r$ is superimposed, for example, when the viewpoint of the user sitting in a driver seat of a vehicle is the user viewpoint position 101 $r$. The superimposed distance range 401 $d$ shown in FIG. 13 is a range on the road surface 70 of the scene in the scenery seen through the front windshield 2 where the virtual image 331 $d$ is superimposed, for example, when the viewpoint of the user sitting in a driver seat of a vehicle is the user viewpoint position 101 $d$.

As in the example shown in FIG. 13, the amount of change of the virtual image in the vertical direction is smaller than the amount of change of the user viewpoint position in the vertical direction. Thus, as the user viewpoint position moves upward in the vertical direction, the angle between the user's line of sight viewing the virtual image and the horizontal surface increases. On the other hand, as the user viewpoint position moves downward in the vertical direction, the angle between the user's line of sight viewing the virtual image and the horizontal surface decreases. Therefore, the length of the superimposed distance range 401 $u$ at the user viewpoint position 101 $u$ higher than the user viewpoint position 101 $r$ is shorter than the length of the superimposed distance range 401 $r$ at the user viewpoint position 101 $r$. The length of the superimposed distance range 401 $d$ at the user viewpoint position 101 $d$ lower than the user viewpoint position 101 $r$ is longer than the length of the superimposed distance range 401 $r$ at the user viewpoint position 101 $r$. In FIG. 13, the end positions of the superimposed distance range 401 $u$, the superimposed distance range 401 $r$, and the superimposed distance range 401 $d$ only on the rear side of the vehicle are shown to be changing, but actually, the end positions of on the front side of the vehicle may also be changeable.

As described above, in the vehicle display device described in Patent Literature 1, when the viewpoint position of the user sitting in the driver seat changes, in the scenery seen through the front windshield, the distance range on the road surface of the scene superimposed with a virtual image changes. As a result, in the vehicle display device disclosed in Patent Literature 1, for example, when the viewpoint position of the user changes upward in the vertical direction, a situation may arise where the user visually recognizes a virtual image that is too small for an object to be superimposed with a virtual image in the scenery seen through the front windshield. Similarly, in the vehicle display device disclosed in Patent Literature 1, for example, when the viewpoint position of the user changes downward in the vertical direction, a situation may arise where the virtual image that is too large for the object in the scenery seen through the front windshield to be superimposed with a virtual image is visually recognized by the user. As described above, the inventor of the present invention recognized that the vehicle display device described in Patent Literature 1 has the possibility of giving a user a sense of discomfort when the viewpoint position of the user changes.

An object of the present invention is to provide a vehicle display device capable of providing appropriate information to a user without being affected by a change in a viewpoint position of a user. Other objects of the present invention will become apparent to those skilled in the art by referring to the embodiments illustrated below and preferred embodiments, and the accompanying drawings.

Solution to Problem

A first aspect according of the present invention concerns a vehicle display device comprising:
  a viewpoint position acquisition unit that acquires a position of a viewpoint of a user sitting in a driver's seat of a vehicle;
  a forward information acquisition unit that acquires forward information that is information on a forward direction of the vehicle;
  an image generation unit that generates an image reflecting the forward information included in a predetermined area of the forward information acquired by the forward information acquisition unit;
  an image display unit having a display surface capable of displaying the image generated by the image generation unit, and
  a projection unit that projects the image toward the translucent member of the vehicle so that the user sitting in the driver's seat is allowed to visually recognize a virtual image by reflecting the image displayed on the display surface by the translucent member of the vehicle,
  wherein the image generation unit determines a position and a size of displaying a first image element among the image elements included in the generated image on the display surface in accordance with the viewpoint position of the user in a vertical direction acquired by the viewpoint position acquisition unit.

The image generation unit determines the position and size of displaying the first image element on the display surface of the image display unit according to the viewpoint position of the user acquired by the viewpoint position acquisition unit. As a result, the vehicle display device according to the first aspect can adjust not only the position at which the virtual image of the first image element is formed, but also the size of forming the virtual image of the first image element. In the vehicle display device according to the first aspect, for example, as compared with a vehicle display device capable of changing only the position at which the virtual image is formed by changing the projection angle or the like of the concave mirror of the projection unit, it is possible to prevent the user from viewing a virtual image that is too large or too small with respect to an object in the scenery where a virtual image is superimposed. As a result, it is possible to provide appropriate information to the user by reducing the sense of discomfort given to the user when the viewpoint position of the user changes in the vertical direction.

In the second aspect of the present invention, as in the first aspect, as the viewpoint position of the user acquired by the viewpoint position acquisition unit moves upward in a vertical direction, the image generation unit determines the position of displaying the first image element on the display surface in a direction corresponding to the upper side in the vertical direction, and determines the size of displaying the first image element to be large in a direction corresponding to the vertical direction.

On the other hand, as the viewpoint position of the user acquired by the viewpoint position acquisition unit moves downward in the vertical direction, the image generation unit may determine the position of displaying the first image element on the display surface in a direction corresponding to the lower side in the vertical direction, and may determine the size of displaying the first image element to be small in a direction corresponding to the vertical direction.

The image generation unit can appropriately determine the display position in a direction corresponding to the vertical direction and the display size in a direction corresponding to the vertical direction of the first image element on the display surface in accordance with the viewpoint position of the user in the vertical direction.

In a third aspect according to the present invention, as in the first or second aspect, the image generation unit may determine the position and the size of displaying the first image element on the display surface so that a range of distance on a road surface of a scene, on which a virtual image related to the first image element is superimposed, in scenery seen by the user through the translucent member, becomes constant without being influenced by a change in the viewpoint position of the user in the vertical direction.

It is possible to provide the user with appropriate information by setting a range of distance on a road surface of the scenery where a virtual image is superimposed without being influenced by a change in the viewpoint position of the user.

In a fourth aspect according to the present invention, as in the first to the second aspect, the image generation unit may determine the position of displaying a second image element different from the first image element among the image elements included in the generated image on the display surface in accordance with the viewpoint position of the user in a vertical direction acquired by the viewpoint position acquisition unit.

When a viewpoint position of a user changes in a vertical direction, the size of the second image element does not change in a vertical direction in a real space. As a result, for example, if the second image element is composed of letters or the like, when the viewpoint position of the user changes in the vertical direction, the user is prevented from hardly recognizing the information represented by a virtual image of the second image element.

In a fifth aspect according to the invention, as in the fourth aspect, as the viewpoint position of the user acquired by the viewpoint position acquisition unit moves upward in a vertical direction, the image generation unit determines the position of displaying the second image element on the display surface in a direction corresponding to the upper side in the vertical direction.

On the other hand, as the viewpoint position of the user acquired by the viewpoint position acquisition unit moves downward in a vertical direction, the image generation unit may determine the position of displaying the second image element on the display surface in a direction corresponding to the lower side in the vertical direction.

It is possible to prevent the distance in a vertical direction in a real space between the virtual image of the first image element and the virtual image of the second image element from becoming large or small when the viewpoint position of the user changes in the vertical direction.

In a sixth aspect according to the invention, as in the fourth or fifth aspect, the display surface of the image display unit includes at least a first use area used for displaying the first image element and a second use area used for displaying the second image element, the image generation unit determines the position and the size of displaying the first image element on the display surface by determining the position and size of the first use area in accordance with the position of the viewpoint of the user in a vertical direction acquired by the viewpoint position acquisition unit, and the image generation unit determines the position and the size of displaying the second image element on the display surface by determining the position and size of the second use area in accordance with the position of the viewpoint of the user in a vertical direction acquired by the viewpoint position acquisition unit.

By determining the position and the size on the display surface of the first use area in accordance with the change of the viewpoint position of the user, it is possible to collectively determine the display positions and the display sizes of all the image elements of the first image element on the display surface. As a result, the processing load of the image generation unit is reduced as compared with the case of determining the display position and the display size on the display surface for each image element of the first image element. Similarly, it is possible to collectively determine the display positions on the display surface of all the image elements of the second image element by determining the position on the display surface of the second use area in accordance with a change in the viewpoint position of the user. As a result, the processing load of the image generation unit is reduced as compared with the case of determining the display position on the display surface for each image element of the second image element.

In a seventh aspect according to the present invention, as in the sixth aspect, the first use area and the second use area may be arranged on the display surface side by side in a direction corresponding to a vertical direction or a direction corresponding to a left and right direction of the vehicle.

For example, as compared with the case where the first use area and the second use area are obliquely arranged, the image generation unit is reduced in the processing load on the determination of changes in the first use area and the second use area in a direction corresponding to the vertical direction according to a change in the user viewpoint position in the vertical direction.

BRIEF DESCRIPTION OF THE DRAWINGS

FIG. 1 A is is a block diagram showing an example of a configuration of a vehicle display device of the present invention.

FIG. 1 B is a diagram showing an example of a configuration of the image display unit shown in FIG. 1 A.

FIG. 1 C is a cross-sectional view of the projection unit shown in FIG. 1 A.

FIG. 2 is a diagram showing examples of scenery and a virtual image visible from a user sitting in a driver seat of a vehicle having the vehicle display device shown in FIG. 1 A.

FIG. 3 is a flowchart showing an example of operation of the vehicle display device shown in FIG. 1 A.

FIG. 4 A is a diagram showing a relationship between a viewpoint position of a user and an image displayed by the image display unit of the vehicle display device shown in FIG. 1 A.

FIG. 4 B is a diagram showing a relationship between a viewpoint position of a user and an image displayed by the image display unit of the vehicle display device shown in FIG. 1 A.

FIG. 4 C is a diagram showing a relationship between a viewpoint position of a user and an image displayed by the image display unit of the vehicle display device shown in FIG. 1 A.

FIG. 5 is a schematic diagram for explaining a relationship between a viewpoint position of a user, a virtual image viewed by the user, and a range of distance on a road surface in scenery where the virtual image is superimposed in the vehicle display device of the present invention.

FIG. 6 is a diagram showing examples of scenery and a virtual image seen from a user sitting in a driver seat of a vehicle, including a vehicle display device according to a second embodiment.

FIG. 7 is a flowchart showing an example of operation of the vehicle display device in the second embodiment.

FIG. 8 is a diagram showing an example of a configuration of an image display unit in a third embodiment.

FIG. 9 is a flowchart showing an example of operation of the vehicle display device in the third embodiment.

FIG. 10 (a) is a diagram showing an example of an image generated by the image generation unit shown in FIG. 1 A, and FIG. 10 (b) to FIG. 10 (d) is a diagram showing an example of an image to be displayed by the image display unit shown in FIG. 1 A.

FIG. 11 is a view showing an example of a method of dividing a use area shown in FIG. 8 into a first use area and a second use area.

FIG. 12 is a diagram showing an example of a method of dividing the use area shown in FIG. 8 into a first use area and a second use area.

FIG. 13 is a schematic diagram for explaining a relationship between a viewpoint position of a user, a virtual image viewed by a user, and a range of distance on a road surface in scenery where the virtual image is superimposed in the vehicle display device disclosed in Patent Literature 1 (Japanese Unexamined Patent Publication No. 2014-210537).

MODE FOR CARRYING OUT THE INVENTION

Preferred embodiments described below are used for easy understanding of the present invention. Accordingly, those skilled in the art should be aware that the present invention is not unduly limited by the embodiments described below.

(1. First Embodiment)

An example of the entire configuration of a vehicle display device 10 of the present invention will be described with reference to FIGS. 1 A, 1 B, and 1 C. In order to facilitate the following explanation, as shown in FIG. 1 A, in a real space, for example, a z-axis is defined in a front-rear direction of a vehicle with a traveling direction of a vehicle 1 as a front direction of the vehicle, a y-axis is defined in a vertical direction, and an x-axis is defined in a left-right direction (the left-right direction of the vehicle) facing the front direction of the vehicle.

As shown in FIG. 1 A, the vehicle display device 10 includes an image display unit 20, an image generation unit 30, a viewpoint position acquisition unit 40, a projection unit 50, and a forward information acquisition unit 60.

As shown in FIG. 1 B, the image display unit 20 has a display surface 21 capable of displaying an image. An image displayable area 210 of the display surface 21 is referred to as a display area 210, for example. An example of the display surface 21 is, for example, a liquid crystal panel 21 having a plurality of pixels 22, as shown in FIG. 1 B. In the liquid crystal panel 21, the display area 210 is, for example, the pixel 22 of the entire liquid crystal panel 21. An example of the image display unit 20 is a liquid crystal panel module 20 having, for example, a liquid crystal panel 21 and a drive circuit 26 for the liquid crystal panel 21.

For example, when a signal representing an image generated by the image generation unit 30 is input, the image display unit 20 displays the image using at least a part of the pixels 22 on the display surface 21 of the display area 210 according to the input signal in the display area 210 of the display surface 21. In the following description, the liquid crystal panel module 20 will be described as an example of the image display unit 20 as appropriate, but the image display unit 20 may be another display device. For example, the image display unit 20 may be a self-luminous display panel module such as an organic EL (Electro Luminescence) element and the like, or may be a reflective type panel module such as DMD (Digital Micromirror Device), LCoS (Liquid Crystal on Silicon) (registered trademark) or a scanning type display device that scans laser light and the like.

In order to facilitate the following explanation, as shown in FIG. 1B, for example, an Ix axis is defined in a horizontal direction of the display surface 21 at a viewpoint of the display surface 21 of the image display unit 20 viewed from the front, and an Iy axis is defined in a longitudinal direction of the surface 21. At this time, a positive direction of the Ix axis represents a left direction of the display surface 21, and a positive direction of the Iy-axis represents an upward direction of the display surface 21. Further, the positive direction of the Ix axis on the display surface 21 corresponds to, for example, the x-axis positive direction described above, that is, the left direction of a vehicle in a real space. Similarly, the positive Iy-axis direction on the display surface 21 corresponds to, for example, the above-described y-axis positive direction, that is, the upper side in the vertical direction (vertically upward direction) in the real space.

The viewpoint position acquisition unit 40 includes, for example, an in-vehicle image acquisition unit 41 and an in-vehicle image analysis unit 42. The viewpoint position acquisition unit 40 acquires a viewpoint position 100 of a user sitting in a driver seat of a vehicle 1. Hereinafter, the viewpoint position 100 of the user sitting in the driver seat of the vehicle 1 is also referred to as a user viewpoint position 100. The viewpoint position acquisition unit 40 is configured to be able to acquire the user viewpoint position 100 at least in the y-axis direction.

The in-vehicle image acquisition unit 41 is, for example, an in-vehicle camera that captures an image inside the vehicle. The in-vehicle image acquisition unit 41 may be, for example, a common in-vehicle camera or the like attached for the purpose of preventing vehicle theft, etc. or may be an in-vehicle camera dedicated to the vehicle display device 10 or the like. The in-vehicle image acquisition unit 41 preferably captures the user viewpoint position 100 from the lower side in the vertical direction than the user viewpoint position 100, and may be attached to a dashboard 4 or the like, for example. In addition, the in-vehicle image acquisition unit 41 is preferably capable of infrared imaging so that the user viewpoint position 100 can be acquired even when the interior of the vehicle is dark. For example, the in-vehicle image acquisition unit 41 outputs an acquired in-vehicle image to the in-vehicle image analysis unit 42.

The in-vehicle image analysis unit 42 analyzes the input image in-vehicle image by using, for example, well-known image processing, pattern matching technique, or the like. As a result of analyzing the input image in front of the vehicle, when the input in-vehicle image includes a face of a user sitting in a driver seat, the in-vehicle image analysis unit 42 acquires the user viewpoint position 100 in a real space by specifying the coordinate (y) of the user viewpoint position 100 for example in the real space. The in-vehicle image analysis unit 42 outputs the acquired user viewpoint position 100 to the image generation unit 30, for example, via a bus 5 such as CAN (Controller Area Network) bus communication. Here, the in-vehicle image analysis unit 42 may be included in the in-vehicle camera, for example, or the image generation unit 30 may include the function of the in-vehicle image analysis unit 42. Further, the image generation unit 30 may directly input the user viewpoint position 100 from the in-vehicle image analysis unit 42 without passing through the bus 5.

The forward information acquisition unit 60 includes, for example, a forward image acquisition unit 61 and a forward image analysis unit 62. The forward information acquisition unit 60 acquires, for example, position information of a lane of a road in front of a vehicle, position information of other vehicles and obstacles existing in front of a vehicle, information on a road sign in front of a vehicle.

The forward image acquisition unit 61 is, for example, an outside-vehicle camera for capturing an image in front of a vehicle. The forward image acquisition unit 61 may be, for example, a shared outside camera used for a drive recorder or the like, or may be an outside camera dedicated to the vehicle display device 10 or the like. Further, although the outside camera may be a monocular camera, it is preferable that the outside camera is a stereo camera in order to accurately acquire a distance between an object existing ahead of a vehicle and an own vehicle 1. In addition, the outside camera may be capable of infrared imaging to be able to capture an image ahead of a vehicle even when the front of the vehicle is dark. For example, the forward image acquisition unit 61 outputs the acquired image ahead of the vehicle to the forward image analysis unit 62.

The forward image analysis unit 62 analyzes the input image ahead of the vehicle by using, for example, well-known image processing, pattern matching technique, or the like. By analyzing the input image ahead of the vehicle, the forward image analysis unit 62 analyzes the forward information on road shape ahead of the vehicle (lane, white line, stop line, crosswalk, road width, lane number, intersection, curve, branch road, etc.). Further, by analyzing the input image ahead of the vehicle, the forward image analysis unit 62 acquires forward information, such as, positions and sizes of other vehicles and obstacles existing ahead of the vehicle, a distance to the own vehicle 1, and a relative speed with the own vehicle 1. For example, the forward image analysis unit 62 outputs the acquired forward information to the image generation unit 30 via the bus 5. Here, the forward image analysis unit 62 may be included, for example, in the outside camera, and the image generation unit 30 may include the function of the forward image analysis unit 62. Further, the image generation unit 30 may directly input the forward information from the forward image analysis unit 62 without passing through the bus 5.

Further, instead of the forward image acquisition unit 61 or in addition to the forward image acquisition unit 61, the forward information acquisition unit 60 may include a laser radar, a millimeter wave radar, an ultrasonic sensor, another known sensor or the like. At this time, the front image analysis unit 62 may acquire the forward information as described above by inputting and analyzing the data outputted by a laser radar, a millimeter wave radar, an ultrasonic sensor, a known sensor or the like instead of the image ahead of the vehicle or in addition to the image ahead of the vehicle.

Furthermore, in FIG. 1A, the in-vehicle image acquisition unit 41 and the forward image acquisition unit 61 are shown as being attached to different locations of the vehicle 1, but this is not necessarily the case, and the in-vehicle image acquisition unit 41 and the forward image acquisition unit 61 may be attached to the same place of the vehicle 1. Further, the in-vehicle image acquisition unit 41 and the forward image acquisition unit 61 may be provided in one same housing.

The image generation unit 30 includes a processing unit 31 and a storage unit 32. The processing unit 31 includes, for example, one or a plurality of microprocessors, a microcontroller, an ASIC (Application Specific Integrated Circuit), an FPGA (Field-Programmable Gate Array), an arbitrary other IC (Integrated Circuit), and the like. The storage unit 32 is, for example, a rewritable RAM (Random Access Memory), a read-only ROM (Read Only Memory), an erasable program read-only EEPROM (Electrically Erasable Programmable Read-Only Memory), a nonvolatile memory, and one or a plurality of memories such as a flash memory capable of storing programs and/or data.

The image generation unit 30 generates an image to be displayed by the image display unit 20, for example, by executing a program stored in the storage unit 32 by the processing unit 31. In accordance with the forward information input from the forward information acquisition unit 60, the image generation unit 30 can include a first image element 250 in a generated image. The first image element 250 can notify the user that a notification object such as another vehicle, an obstacle, or the like is present on a road ahead of the vehicle. In other words, the first image element 250 is an information display that the user can recognize more accurately the information included in that image element by superimposing a virtual image on scenery such as a road surface in front of a vehicle, and correlating the information included in that image element with the scenery I front of the vehicle. For example, when there are a plurality of objects to be notified such as other vehicles and obstacles on a road ahead of a vehicle, the image generation unit 30 includes a plurality of first image elements 250 in a generated image. Hereinafter, the first image element 250 is also referred to as a superimposed mark 250 as appropriate. The superimposed mark 250 (first image element 250) may include, for example, a mark such as an arrow indicating route guide information input from a navigation device (not shown) provided in the vehicle 1.

In addition, the image generation unit 30 determines a position and size of displaying one or a plurality of superimposed marks 250 included in the generated image, that is, the superimposed mark 250, in the display area 210 of the display surface 21 of the image display unit 20, in accordance with the user viewpoint position 100 in the vertical direction input from the viewpoint position acquisition unit 40. For example, the storage unit 32 of the image generation unit 30 stores a table, in which the user viewpoint position 100 and parameters for determining the display position and the display size (size) of the superimposition mark 250 on the display area 210 corresponding to the user viewpoint position 100 are associated with each other. The image generation unit 30 determines the display position and the display size of the superimposed mark 250 on the display area 210 corresponding to the input user viewpoint position 100, for example, by referring to the table by the processing unit 31.

In addition, the storage unit 32 of the image generation unit 30, for example, stores arithmetic expressions for determining the display position and the display size of the superimposed mark 250 on the display area 210 corresponding to the user viewpoint position 100. The image generation unit 30 determines the display position and the display size of the superimposed mark 250 on the display area 210 corresponding to the input user viewpoint position 100, for example, by calculating the arithmetic expressions by the processing unit 31. The relationship between the user viewpoint position in the vertical direction and the display position and the size of the superimposed mark 250 will be described later.

The projection unit 50 projects the image displayed by the image display unit 20 toward a translucent member 2 such as the front windshield 2 of the vehicle 1. Light 80 forming a projected image is reflected into a vehicle cabin by the front windshield 2. Hereinafter, the light 80 forming an image is also referred to as an image light 80. The projection unit 50 projects an image such that the image light 80 reflected by the front windshield 2 is incident toward the user viewpoint position 100. The translucent member 2 of the vehicle 1 may be a combiner provided in the vehicle 1.

A user sitting in a driver seat can visually recognize a virtual image 330 formed in the front of a vehicle with respect to the front windshield 2 by the incident of the image light 80 at the user viewpoint position 100. The user can visually recognize the virtual image 330 in a state that at least a part of the scenery seen through the front windshield 2 and the virtual image 330 are superimposed with each other. The virtual image 330 includes, for example, a virtual image superimposed mark 350 that is a virtual image of the above-described superimposed mark 250.

An example of a structure of the projection unit 50 will be described with reference to FIG. 1 C. The projection unit 50 houses, for example, an optical system such as a plane mirror 54 and a concave mirror 55, and a concave mirror actuator 56 in a housing 51. The housing 51 includes, for example, an upper case 52 and a lower case 53 that are made of black light-shielding synthetic resin or the like and placed on the dashboard 4 of the vehicle 1. An upper case opening 52 a is provided substantially in the middle of the upper case 52 in the z-axis direction. The upper case opening 52 a is covered with a transparent cover 57 made of transparent translucent synthetic resin or the like, for example. On the vehicle rear side of the lower case 53, for example, a lower case opening 53 a is provided. The lower case opening 53 a is provided in the lower case 53 so that, for example, the image light 80 emitted from the display surface 21 of the image display unit 20 attached to the outside of the housing 51 can be entered.

The plane mirror 54 is attached to the vehicle rear side of the lower case 53 via, for example, a mounting member (not shown). The mounting position and mounting angle of the plane mirror 54 are fixed so that, for example, the image light 80 emitted from the display surface 21 incident from the lower case opening 53 a is reflected toward the front of the vehicle.

The concave mirror 55 is attached to the vehicle front side than the plane mirror 54 of the lower case 53, for example, via a concave mirror actuator 56. The concave mirror 55 can be rotated by the concave mirror actuator 56, for example, with the x-axis as a rotation axis. The concave mirror 55 is fixed in position so that, for example, the image light 80 reflected by the plane mirror 54 is incident, and the attachment angle is finely adjusted so that the incident image light 80 is reflected toward the front windshield 2. Depending on the attachment angle, a table or arithmetic expressions for determining, for example, the user viewpoint position 100 of the image generation unit 30 stored in the storage unit 32 and the display position and display size of the superimposed mark 250 on the display area 210 corresponding to the user viewpoint position 100 is corrected.

The concave mirror actuator 56 includes, for example, a motor, a speed reduction mechanism, a concave mirror rotating member, and a support member of the concave mirror 55, all of which are not shown. The concave mirror actuator 56 is attached to the lower case 53 on the lower side in the vertical direction of the concave mirror 55 via, for example, a mounting member (not shown). The concave mirror actuator 56 rotates the motor according to a signal input from an actuator control unit (not shown), decelerates the motor rotation by the speed reduction mechanism, and transmits the rotation to the concave mirror rotating member to rotate the concave mirror 55. Note that the concave mirror actuator 56 is not necessarily provided.

Further, in the upper case 52 of the housing 51 in FIG. 1 C, a light shielding portion 52 b is provided between the upper case opening 52 a and the plane mirror 54. The light shielding portion 52 b is provided, for example, to prevent light from the outside of the housing 51 incident from the upper case opening portion 52 a from traveling to the image display unit 20. The example of the structure of the projection unit 50 described with reference to FIG. 1 C is merely an example and does not limit the structure of the projection unit 50 of the vehicle display device 10 at all.

FIG. 2 shows an example of scenery and a virtual image seen by a user sitting in a driver seat of the vehicle 1 through the front windshield 2. In the example shown in FIG. 2, as an example of the scenery seen through the front windshield 2, a three-lane road extending in front of the vehicle and another vehicle (front vehicle) 90 existing in front of the vehicle are shown. In the example of the scenery seen through the front windshield 2 shown in FIG. 2, an object to be notified is the front vehicle 90. In the example shown in FIG. 2, the virtual image includes a virtual image superimposed mark 350. In the example shown in FIG. 2, the virtual image superimposed mark 350 is viewed superimposed on the front vehicle 90 by the user. In the example shown in FIG. 2, one virtual image superimposed mark 350 is shown. However, when there are plural front vehicles or the like, for example, a plurality of virtual image superimposed marks 350 is visually recognized by the user.

In addition, in the example shown in FIG. 2, the area 310 is an area 310 corresponding to the display area 210 on the display surface 21 of the image display unit 20. Hereinafter, the area 310 corresponding to the display area 210 on the display surface 21 of the image display unit 20 will also be referred to as a virtual image display area 310. That is, the virtual image display area 310 is an area where the user can visually recognize a virtual image.

Therefore, the image generation unit 30 generates an image, reflecting the forward information included in the area superimposing with the virtual image display area 310 in the scenery seen through the front windshield 2. In other words, the image generation unit 30 generates an image, including one or more superimposed marks 250 for notifying one or more notifying objects included in an area superimposing with the virtual image display area 310 in the scenery seen through the front windshield 2.

An example of the operation of the vehicle display device 10 will be described with reference to FIG. 3. The operation of the vehicle display device 10 is started after a predetermined standby time has elapsed from, for example, when the power of the vehicle 1 is turned on, when an engine (not shown) is driven, or when the power of the vehicle 1 is turned on or the engine is driven.

In step S 01, the forward information acquisition unit 60 acquires the forward information. In step S 02, the viewpoint position acquisition unit 40 acquires the user viewpoint position 100 in the vertical direction. Note that steps S 01 and S 02 are not necessarily in this order, and the order may be changed.

In step S 03, the image generation unit 30 generates an image, including, for example, the superimposed mark 250, according to the forward information acquired by the forward information acquisition unit 60 in step S 01. Note that the image generation unit 30 does not need to generate an image corresponding to the user viewpoint position 100 in the vertical direction.

In step S 04, the image generation unit 30 determines the position and size of the display area 210 on the display surface 21 for displaying the superimposed mark 250 included in the image generated in step S 03 in accordance with the user viewpoint position 100 in the vertical direction acquired by the viewpoint position acquisition unit 40 in step S 02.

In step S 05, the image display unit 20 displays the image generated by the image generation unit 30 in the display area 210 on the display surface 21 in step S 03. At this time, the image display unit 20 displays the superimposed mark 250 at the position on the display area 210 determined by the image generation unit 30 in step S 04 with the size determined by the image generation unit 30 in step S 04.

When the process of step S 05 is executed, the flow returns to Start. Here, in order for the flowchart shown in FIG. 3 to be executed repetitively at predetermined intervals set beforehand, predetermined standby time may be inserted before the flow returns to Start after the execution of the processing of Step S 05 is completed.

With reference to FIGS. 4 A, 4 B and 4 C, the relationship between the user viewpoint position 100 in the vertical direction and the position and size of displaying the superimposed mark 250 will be described. The left side of FIGS. 4 A, 4 B and 4 C show the coordinate axes representing the user viewpoint position 100 on the y-axis in the real space. The right sided of FIGS. 4 A, 4 B, and 4 C show the display position and size of displaying the superimposed mark 250 on the display surface 21 determined by the image generation unit 30 according to the user viewpoint position 100 on the y-axis in the real space.

On the left side of FIG. 4 A, the user viewpoint position 100 r on the y-axis is shown. Hereinafter, the user viewpoint position 100 r shown in FIG. 4 A is also referred to as a reference user viewpoint position 100 r for convenience. For example, when the user viewpoint position 100 in the vertical direction acquired in step S 02 shown in FIG. 3 is the reference user viewpoint position 100 r, in step S 04 shown in FIG. 3, the image generation unit 30 generates the display position and display size of the superimposed mark 250 on the display surface 21 as those of the superimposed mark 250 r shown on the right side of FIG. 4 A. Hereinafter, the superimposed mark 250 r corresponding to the reference user viewpoint position 100 r shown in FIG. 4 A is also referred to as a reference superimposed mark 250 r for convenience.

The user viewpoint position 100 u shown in FIG. 4 B is an example of the user viewpoint position 100 located on the upper side in the vertical direction compared with the reference user viewpoint position 100 r. For example, when the user viewpoint position 100 acquired in step S 02 shown in FIG. 3 is the user viewpoint position 100 u, in step S 04 shown in FIG. 3, the image generation unit 30 determines the display position and display size of the superimposed mark 250 on the display surface 21 as those of the superimposed mark 250 u shown on the right side of FIG. 4 B.

The superimposed mark 250 u shown in FIG. 4 B is positioned on the Iy-axis positive direction side as compared with the reference superimposed mark 250 r. In addition, the size 251 u in the Iy axis direction in the superimposed mark 250 u shown in FIG. 4 B is larger than the size 251 r in the Iy-axis direction in the reference superimposed mark 250 r.

As the user viewpoint position 100 detected by the viewpoint position acquisition unit 40 moves upward in the vertical direction in this way, the image generating unit 30 determines the display position of the superimposed mark 250 on the display surface 21 to be located on the Iy-axis positive direction side. In other words, when the user viewpoint position 100 approaches a not-shown roof of the vehicle 1 with reference to the current user viewpoint position 100, the image generation unit 30 determines the display position of the superimposed mark 250 on the display surface 21 to be located on the Iy-axis positive direction side with reference to the current display position. Further, as the user viewpoint position 100 detected by the viewpoint position acquisition unit 40 moves upward in the vertical direction, the image generation unit 30 determines the display size of the superimposed mark 250 on the display surface 21 to be increased in the Iy-axis direction. That is, when the user viewpoint position 100 approaches the not-shown roof of the vehicle 1 with reference to the current user viewpoint position 100, the image generation unit 30 determines the display size of the superimposed mark 250 on the display surface 21 to be increased in the Iy-axis direction with reference to the current display size.

The user viewpoint position 100 d shown in FIG. 4 C is an example of the user viewpoint position 100 located on the lower side in the vertical direction as compared with the reference user viewpoint position 100 r. For example, when the user viewpoint position 100 acquired in step S 02 shown in FIG. 3 is the user viewpoint position 100 d, in step S 04 shown in FIG. 3, the image generation unit 30 determines the display position and display size of the superimposed mark 250 on the display surface 21 as those of the superimposed mark 250 d shown on the right side of FIG. 4C.

The superimposed mark 250 d shown in FIG. 4C is located on the Iy-axis negative direction side as compared with the reference superimposed mark 250 r. Further, the size 251 d in the Iy-axis direction of the superimposed mark 250 d shown in FIG. 4C is smaller than the size 251 r in the Iy-axis direction of the reference superimposed mark 250 r.

In other words, as the user viewpoint position 100 detected by the viewpoint position acquisition unit 40 moves downward in the vertical direction, the image generation unit 30 determines the display position of the superimposed mark 250 on the display surface 21 to be located on the Iy-axis negative direction side. That is, when the user viewpoint position 100 approaches the floor of the vehicle 1 with reference to the current user viewpoint position 100, the image generation unit 30 determines the display position of the superimposed mark 250 on the display surface 21 to be located on the Iy-axis negative direction side with reference to the current display position. Further, as the user viewpoint position 100 detected by the viewpoint position acquisition unit 40 moves downward in the vertical direction, the image generation unit 30 determines the display size of the superimposed mark 250 on the display surface 21 to be decreased in the Iy-axis direction. That is, when the user viewpoint position 100 approaches the floor of the vehicle 1 with reference to the current user viewpoint position 100, the image generation unit 30 determines the display size of the superimposed mark 250 to be decreased in the Iy-axis direction with reference to the current display size.

FIG. 5 is a schematic diagram for explaining a relationship between the user viewpoint position 100 moves downward in the vertical direction, the virtual image of the superimposed mark 250 (virtual image superimposed mark 350), and the range of distance on the road surface 70 of the scenery on which the virtual image superimposed mark 350 is superimposed. In FIG. 5, the change amount of the user viewpoint position 100 is shown exaggerated to clearly illustrate the relationship between the user viewpoint position 100 in the vertical direction, the virtual image superimposed mark 350, and the range of distance on the road surface 70 of the scenery on which the virtual image superimposed mark 350 is superimposed. Specifically, the distance between the user viewpoint 100 r and the user viewpoint 100 u, the distance between the user viewpoint 100 r and the user viewpoint 100 d in the vertical direction shown in FIG. 5 is actually much closer. The range of distance on the road surface 70 of the scenery on which the virtual image superimposed mark 350 is superimposed is hereinafter also referred to as a superimposed distance range 400.

FIG. 5 shows a virtual image superimposed mark 350 r at the user viewpoint position 100 r shown in FIG. 4 A, a virtual image superimposed mark 350 u at the user viewpoint position 100 u shown in FIG. 4 B, and a user viewpoint position 100 d at the virtual image superimposed mark 350 d in FIG. 4 C. Since the virtual image superimposed mark 350 u is the virtual image 330 corresponding to the superimposed mark 250 u shown in FIG. 4B, as compared with the virtual image superimposed mark 350 r that is the virtual image 330 corresponding to the reference superimposed mark 250 r shown in FIG. 4 A, it is positioned on the upper side in the vertical direction in the real space and the size in the vertical direction in the real space is increased. Similarly, since the virtual image superimposed mark 350 d is the virtual image 330 corresponding to the superimposed mark 250 d shown in FIG. 4C, compared with the virtual image superimposed mark 350 r that is the virtual image 330 corresponding to the reference superimposed mark 250 r shown in FIG. 4A, it is positioned on the lower side in the vertical direction in the real space, and the size in the vertical direction in the real space is decreased.

FIG. 5 shows a superimposed distance range 400 r, which is a range of distance on the road surface 70 of a scene superimposing with the virtual image superimposed mark 350 r in the scenery seen through the front windshield 2 at the user viewpoint position 100 r, a superimposed distance range 400 u, which is a range of distance on the road surface 70 of a scene superimposing with the virtual image superimposed mark 350 u in the scenery seen through the front windshield 2 at the user viewpoint position 100 u, and a superimposed distance range 400 d, which is a range of distance on the road surface 70 of a scene superimposing with the virtual image superimposed mark 350 d in the scenery seen through the front windshield 2 at the user viewpoint position 100 d.

Referring to FIG. 5, the superimposed distance range 400 r, the superimposed distance range 400 u, and the superimposed distance range 400 d are the same. As in the example shown in FIG. 5, the amount of change in the vertical direction of the virtual image superimposed mark 350 is smaller than the amount of change in the vertical direction of the user viewpoint position 100. Then, for example, as the user viewpoint position 100 moves upward in the vertical direction, it increases the angle between the user's line of sight of viewing the virtual image superimposed mark 350 and the horizontal plane. On the other hand, for example, as the user viewpoint position 100 moves downward in the vertical direction, it decreases the angle between the user's line of sight of viewing the virtual image superimposed mark 350 and the horizontal plane.

As a result, in order to make the superimposed distance range 400 constant without being affected by the user viewpoint position 100 in the vertical direction, as the user viewpoint position 100 moves upward in the vertical direction, it is necessary not only to move the position in the vertical direction of the virtual image superimposed mark 350 upward, but also to increase the size in the vertical direction. Similarly, in order to make the superimposed distance range 400 constant without being affected by the user viewpoint position 100 in the vertical direction, as the user viewpoint position 100 moves downward in the vertical direction, it is necessary not only to move the position in the vertical direction of the virtual image superimposed mark 350 downward, but also to decrease the size in the vertical direction.

As described above, according to the user viewpoint position 100 in the vertical direction, the image generation unit 30 of the vehicle display device 10 can appropriately determine the display position on the Iy-axis of the superimposed mark 250 on the display surface 21 and the display size in the Iy-axis direction. That is, the image generation unit 30 of the vehicle display device 10 can not only adjust the display position in the vertical direction of the superimposed mark 250 on the display surface 21 according to the user viewpoint position 100 acquired by the viewpoint position acquisition unit 40, but also adjust the display size of the superimposed mark 250 in the vertical direction of the superimposed mark 250 on the display surface 21. As a result, the superimposed distance range 400 can be made constant without being affected by the user viewpoint position 100 in the vertical direction.

By making the superimposed distance range 400 constant, when the user viewpoint position 100 changes in the vertical direction, it is possible to prevent a displacement of a notifying object superimposing with the virtual image superimposed mark 350 in the scenery seen through the front windshield 2. At the same time, it is possible to prevent the user from viewing the virtual image superimposed mark 350 that is too large or too small with respect to the notifying object. As a result, it is possible to reduce an uncomfortable feeling to the user when the user viewpoint position 100 changes in the vertical direction. Therefore, the vehicle display device 10 of the present invention can provide appropriate information to the user without being affected by the user viewpoint position 100.

Here, steps S 02 and S 04 shown in FIG. 3 need not necessarily be executed every time. For example, steps S 02 and S 04 may be executed only when the flow shown in FIG. 3 is executed for the first time after the power of the vehicle 1 is turned on. Thereafter, when the flow shown in FIG. 3 is executed for the second time and thereafter, after the power of the vehicle 1 is turned on, the processes of steps S 02 and S 04 may be omitted. For example, while the user driving the vehicle 1 is not changed, there is a low possibility that the user viewpoint position 100 particularly in the vertical direction is greatly changed. Therefore, by obtaining the user viewpoint position 100 of the user driving the vehicle 1 only once after the power of the vehicle 1 is turned on, it is possible, for example, to reduce an uncomfortable feeling to the user when the user viewpoint position 100 changes in the vertical direction, and to speed up the operation of the vehicle display device 10.

In the above description, the superimposed distance range 400 has been described as being constant without being affected by the change of the user viewpoint position 100 in the vertical direction, but it is not necessarily limited to this. That is, for example, the image generation unit 30 may determine the display position and display size of the superimposed mark 250 on the display surface 210 in three steps according to three stages of user viewpoint positions, including the reference user viewpoint position 100 $r$ and the user viewpoint positions upward and downward in the vertical direction of the position 100 $r$.

(2. Second Embodiment)

A second embodiment of the vehicle display device 10 of the present invention will be described with reference to FIGS. 6 and 7. Since the second embodiment is a modification of the above-described first embodiment, only portions different from the first embodiment will be described, and descriptions of similar portions will be omitted. In addition, the same reference numerals as those used in the description of the first embodiment are used for constituent elements common to the first embodiment.

In the first embodiment of the above-described vehicle display device 10, a user sitting in a driver seat of the vehicle 1 is allowed to properly view the virtual image superimposed mark 350 informing the presence of a notifying object in front of the vehicle 1. In the second embodiment of the vehicle display device 10 described below, a user sitting in a driver seat of the vehicle 1 is allowed to properly view not only the virtual image superimposed mark 350, but also a virtual image non-superimposed mark 370 described later for providing information such as a traveling speed of the vehicle 1.

In the second embodiment, for example, the image generation unit 30 is able to include into a generated image the information included in a signal that is input from a not-shown ECU (Electronic Control Unit) and/or a device provided in the vehicle 1 via the bus 5 or directly, a second image element 270 which is an image element that can be provided to the user.

The information included in the signal input from the not-shown ECU of the vehicle 1 is, for example, the information such as fuel remaining, a current vehicle speed, fuel consumption, battery level, and the like. Further, the information included in the signal input from the not-shown device provided in the vehicle 1 includes, for example, speed limit information on a road on which the vehicle 1 is traveling now, which is input from a not-shown navigation device. That is, unlike the first image element 250, the second image element 270 is an information display that allows the user to accurately recognize the information included in an image element without superimposing a virtual image on the scenery such as a road surface in front of a vehicle.

For example, when there are two or more information included in a signal input from an ECU and/or a not-shown device of the vehicle 1, the image generation unit 30 can include a plurality of second image elements 270 in a generated image. Hereinafter, the second image element 270 is also referred to as a non-superimposed mark 270 as appropriate.

FIG. 6 shows an example of scenery and a virtual image seen by the user sitting in a driver seat of the vehicle 1 through the front windshield 2 in the second embodiment. In addition to the example shown in FIG. 2, the example shown in FIG. 6 shows a virtual image non-superimposed mark 370-1 representing a speed limit of a road on which the vehicle 1 is traveling now and a virtual image non-superimposed mark 370-2 representing a current traveling speed of the vehicle 1.

Also in the example shown in FIG. 6, as in the first embodiment, the virtual image superimposed mark 350 changes in a position and size in the vertical direction in the real space according to a change in the user viewpoint position 100 in the vertical direction. As a result, the superimposed distance range 400 of the virtual image superimposed mark 350 can be made constant without being affected by the user viewpoint position 100 in the vertical direction.

However, in the example shown in FIG. 6, the virtual image non-superimposed marks 370-1 and 370-2 need not to be visually recognized by the user in a state of being superimposed on a notifying object in the scenery seen through the front windshield 2. Further, as in the example shown in FIG. 6, particularly when the virtual image non-superimposed mark 370 is a character such as a number, a virtual image non-superimposed mark 370 in the vertical direction in a real space changes according to a change in the user viewpoint position 100, and the user may hardly recognize the information represented by the virtual image non-superimposed mark 370.

Therefore, in the second embodiment, the image generation unit 30 determines only the display position on the Iy-axis of the non-superimposed mark 270 on the display surface 21 according to the user viewpoint position 100 in the vertical direction. That is, in the second embodiment, the image generation unit 30 does not change the display size on the Iy-axis of the non-superimposed mark 270 on the display surface 21 when the user viewpoint position 100 in the vertical direction changes. Also in the second embodiment, as in the first embodiment, the image generation unit 30 properly determines the display position of on the Iy-axis of the superimposed mark 250 on the display surface 21 and the display size in the Iy-axis direction according to the user viewpoint position 100 in the vertical direction.

The determination of the display position on the Iy-axis of the non-superimposed mark 270 on the display surface 21 according to the user viewpoint position 100 in the vertical direction by the image generation unit 30 in the second embodiment is the same as the determination of the display position on the Iy-direction of the superimposed mark 250 on the display surface 21 according to the user viewpoint position 100 in the vertical direction by the image generation unit 30 in the first embodiment. In other words, as the user viewpoint position 100 detected by the viewpoint position acquisition unit 40 moves upward in the vertical direction, the image generation unit 30 determines the display position of the non-superimposed mark 270 on the display surface 21 to be located on the Iy-axis positive direction side. Similarly, as the user viewpoint position 100 detected by the viewpoint position acquisition unit 40 moves downward in the vertical direction, the image generation unit 30 determines the display position of the non-superimposed mark 270 on the display surface 21 to be located on the Iy-axis negative direction side.

An example of the operation of the second embodiment of the vehicle display device 10 will be described with reference to FIG. 7. The flowchart of the operation of the second embodiment of the vehicle display device 10 shown in FIG. 7 is partially changed from the flowchart of the operation of the first embodiment shown in FIG. 3. Specifically, the flowchart shown in FIG. 7 corresponds to the one in which a new processing step (step S 105) is inserted between step S 04 and step S 05 in the flowchart shown in FIG. 3. Other processes are the same as the flowchart shown in FIG. 3. Therefore, regarding the flowchart shown in FIG. 7, only portions different from the flowchart shown in FIG. 3 will be described, and a description of similar portions will be omitted by showing the corresponding relationship.

Step S 101 corresponds to step S 01 of the flowchart shown in FIG. 3. Step S 102 corresponds to step S 02 of the flowchart shown in FIG. 3.

Step S 103 corresponds to step S 03 of the flowchart shown in FIG. 3. However, in step S 103, the image generation unit 30 generates an image, including the non-superimposed mark 270 in addition to the superimposed mark 250 according to the forward information acquired by the forward information acquisition unit 60 in step S 01.

Step S 104 corresponds to step S 04 of the flowchart shown in FIG. 3. In step S 105, the image generation unit 30 determines the position in the display area 210 on the display surface 21 for displaying the non-superimposed mark 270 included in the image generated in step S 03 according to the user viewpoint position 100 in the vertical direction acquired by the viewpoint position acquisition unit 40 in step S 02.

Step S 106 corresponds to step S 05 of the flowchart shown in FIG. 3. However, in step S 106, the image display unit 20 displays the superimposed mark 250 at the position and in the size in the display area 210 determined by the image generation unit 30 in step S 104, and also displays the non-superimposed mark 270 at the position in the display area 210 determined by the image generation unit 30 in step S 105.

When the process of step S 106 is executed, the flow returns to Start. It should be noted that steps S 104 and S 105 are not necessarily in this order, and the order may be changed.

As described above, in the second embodiment of the vehicle display device 10, the image generation unit 30 of the vehicle display device 10 may properly determine the display position of the non-superimposed mark 270 in the Iy-axis of the display surface 21 according to the user viewpoint position 100 in the vertical direction. In other words, when the user viewpoint position 100 in the vertical direction changes, the virtual image non-superimposed mark 370, which is a virtual image of the non-superimposed mark 270, is maintained in the relative positional relationship with the virtual image superimposed mark 350. As a result, when the user viewpoint position 100 changes in the vertical direction, it is possible to prevent increasing or decreasing of the distance between the virtual image superimposed mark 350 and the virtual image non-superimposed mark 370 in the vertical direction in the real space.

Furthermore, when the user viewpoint position 100 changes in the vertical direction, the size of the virtual image non-superimposed mark 370 in the vertical direction in the real space does not change. As a result, when the user viewpoint position 100 changes in the vertical direction, as compared with a case where the size of the virtual image non-superimposed mark 370 in the vertical direction in the real space is changed, it is possible to prevent the user from hardly recognizing the information represented by the virtual image non-superimposed mark 370.

(3. Third Embodiment)

A third embodiment of the vehicle display device 10 of the present invention will be described with reference to FIGS. 8, 9, 10, 11, and 12. Since the third embodiment is a modification of the first embodiment and the second embodiment described above, only portions different from the first embodiment and the second embodiment will be described, and descriptions of similar portions will be omitted. In addition, the same reference numerals as those used in the description of the first embodiment or the second embodiment are used for constituent elements common to the first embodiment or the second embodiment.

In the second embodiment of the vehicle display device 10 described above, the image generation unit 30 directly determines the display position and the display size of the superimposed mark 250 on the display surface 21 and the display position of the superimposed mark 270 on the display surface 21, in accordance with the change in the user viewpoint position 100 in the vertical direction. According to the third embodiment of the vehicle display device 10 described below, the image generation unit 30 determines the area of the display surface 21 for displaying the superimposed mark 250 (first use area 240) and the area of the display surface 21 for displaying the non-superimposed mark 270 (second use area 260). As a result, the display position and display size of the superimposed mark 250 on the display surface 21 and the display position of the non-superimposed mark 270 on the display surface 21 are indirectly determined.

In the example of the image display unit 20 shown in FIG. 8, the first use area 240 and the second use area 260 determined by the image generation unit 30 are shown. In the example of the image display unit 20 shown in FIG. 6, the first use area 240 is, for example, an area 240 consisting of pixels 22 used for displaying the superimposed mark 250 in the display area 210, which consists of all pixels 22 of the liquid crystal panel 21. In the example of the image display unit 20 shown in FIG. 6, the second use area 260 is, for example, an area 260 consisting of the pixels 22 used for displaying the non-superimposed mark 270 in the display area 210, which consists of all pixels 22 of the liquid crystal panel 21. The first use area 240 and the second use area 260 are collectively referred to as a use area 220. In other words, in the third embodiment, an image generated by the image generation unit 30 is displayed in the use area 220, and an image is not displayed outside the use area 220.

An example of the operation of the vehicle display device 10 according to the third embodiment will be described with reference to FIG. 9. The flowchart of the operation of the third embodiment of the vehicle display device 10 shown in FIG. 9 is partially modified from the flowchart of the operation of the second embodiment shown in FIG. 7. Specifically, in the flowchart shown in FIG. 9, a processing step (step S 204) corresponding to step S 104 in the flowchart shown in FIG. 7 and a processing step (step S 205) corresponding to step S 105 are different. Other processes are the same as the flowchart shown in FIG. Therefore, only portions different from the flowchart shown in FIG. 7 will be described with reference to the flowchart shown in FIG. 9, and a description of similar portions will be omitted by showing the corresponding relationship.

Step S 201 corresponds to step S 101 of the flowchart shown in FIG. 7. Step S 202 corresponds to step S 102 of the flowchart shown in FIG. 7. Step S 203 corresponds to step S 103 of the flowchart shown in FIG. 7.

In step S 204, the image generation unit 30 determines the position and size of the first use area 240 in the Iy-axis direction of the display area 210, based on the user viewpoint position 100 in the vertical direction acquired by the viewpoint position acquisition unit 40 in step S 202. The correlation between the user viewpoint position 100 in the vertical direction and the position and size of the first use area 240 in the Iy-axis on the display area 210 will be described later.

In step S 205, the image generation unit 30 determines the position of the second use area 260 in the Iy-axis direction of the display area 210 according to the user viewpoint position 100 in the vertical direction acquired by the viewpoint position acquisition unit 40 in step S 202. The correlation between the user viewpoint position 100 in the vertical direction and the position of the second use area 260 in the Iy-axis direction on the display area 210 will be described later.

In step S 206, the image display unit 20 displays the superimposed mark 250 among the images generated by the image generation unit 30 in step S 203 in the first use area 240 determined by the image generation unit 30 in step S 204. At the same time, the image display unit 20 displays the non-superimposed mark 270 among the images generated by the image generation unit 30 in step S 203 in the second use area 260 determined by the image generation unit 30 in step S 205.

When the process of step S 206 is executed, the flow returns to Start. It should be noted that steps S 204 and S 205 are not necessarily in this order, and the order may be changed.

Referring to FIG. 10, a description will be given to the relation between the user viewpoint position 100 in the vertical direction, the position and size of the first use area 240 in the Iy-axis direction of the display area 210, and the size of the second use area 260 in the Iy-axis direction on the display are 210.

FIG. 10 (a) is a diagram showing an example of an image generated by the image generation unit 30. The ix-axis shown in FIG. 10 (a) corresponds to the Ix-axis of the display surface 21 of the image display unit 20. The iy-axis shown in FIG. 10 (a) corresponds to the Iy-axis of the display surface 21 of the image display unit 20. Further, in the example shown in FIG. 10 (a), a mark 250 i displayed as a superimposed mark 250 on the display surface 21 and a mark 270 i displayed as a non-superimposed mark 270 on the display surface 21 are shown. Further, the mark 250 i is generated in the area 240 i corresponding to the first use area 240 of the display area 210 on the display surface 21, and the mark 270 i is generated in the area corresponding to the second use area 260 of the display area 210 on the display surface 21 260 i, respectively.

FIG. 10 (b) shows an example, when the user viewpoint position 100 in the vertical direction is, for example, the reference user viewpoint position 100 r shown in FIG. 4 A, the generated image shown in FIG. 10 (a) is displayed in the display area 210. Hereinafter, the use area 220 r of the display area 210 shown in FIG. 10 (b) will also be referred to as a reference use area 220 r for convenience, the first use area 240 r of the reference use area 220 will also be referred to as a first reference use area 240 r, and the second use area 260 r of the reference use area 220 will also be referred to as a second reference use area 260 r. Further, hereinafter, the superimposed mark 250 r displayed in the first reference use area 240 r shown in FIG. 10 (b) will also be referred to as a reference superimposed mark 250 r as described above, and the reference non-superimposed mark 270 r displayed in the second reference use area 260 r will also be referred to as a reference non-superimposed mark 270 r for convenience.

FIG. 10 (c) shows an example, when the user viewpoint position 100 in the vertical direction is the user viewpoint position 100 u shown in FIG. 4 B, for example, the generated image shown in FIG. 10 (a) is displayed in the display area 210. As shown in FIG. 4 B, the user viewpoint position 100 u is on the upper side of the reference user viewpoint position r in the vertical direction.

As shown in FIG. 10 (c), the use area 220 u is determined by the image generation unit 30 to be located on the Iy-axis positive direction side than the reference use area 220 r. As shown in FIG. 10 (c), the first use area 240 u is determined by image generation unit 30 to be located on the Iy-axis positive direction side than the first reference use area 240 r to increase the size in the Iy-axis direction. As shown in FIG. 10 (c), since the first use area 240 u has been thus determined, the superimposed mark 250 u is positioned on the Iy-axis positive direction side as compared with the reference superimposed mark 250 r to increase the size in the Iy-axis direction.

As shown in FIG. 10 (c), the second use area 260 u is determined by image generation unit 30 to be located on the Iy-axis positive direction side than the second reference use area 260 r, so that the size in the Iy-axis direction becomes the same as the second reference use area 260 r. As shown in FIG. 10 (c), since the second use area 260 u has been thus determined, the non-superimposed mark 270 u is positioned on the Iy-axis positive direction side as compared with the reference non-superimposed mark 270 r.

Namely, as the user viewpoint position 100 detected by the viewpoint position acquisition unit 40 moves upward in the vertical direction, the image generation unit 30 positions the first use area 240 of the display area 210 to the Iy-axis positive direction side to increase the size in the Iy-axis direction. Along with this, the superimposed mark 250 is positioned on the Iy-axis positive direction side in the display area 210, and the size in the Iy-axis direction is increased.

Further, as the user viewpoint position 100 detected by the viewpoint position acquisition unit 40 moves upward in the vertical direction, the image generation unit 30 positions the second use area 260 of the display area 210 to the Iy-axis positive direction side. Along with this, the non-superimposed mark 270 is positioned on the Iy-axis positive direction side in the display area 210.

FIG. 10 (d) shows an example, when the user viewpoint position 100 in the vertical direction is the user viewpoint position 100 d shown in FIG. 4C, for example, the generated image shown in FIG. 10 (a) is displayed in the display area 210. As shown in FIG. 4C, the user viewpoint position 100 d is located on the lower side in the vertical direction than the reference user viewpoint position r.

As shown in FIG. 10 (d), the use area 220 d is determined by the image generation unit 30 to be located on the Iy-axis negative direction side than the reference use area 220 r. As shown in FIG. 10 (d), the first use area 240 d is determined by the image generation unit 30 to be located on the Iy-axis negative direction side than the first reference use area 240 r to decrease the size in the Iy-axis direction. As shown in FIG. 10 (d), since the first use area 240 d has been thus determined, the superimposed mark 250 d is positioned on the Iy-axis negative direction side as compared with the reference superimposed mark 250 r to decrease the size in the Iy-axis direction.

As shown in FIG. 10 (d), the second use area 260 d is determined by the image generation unit 30 to be located on the Iy-axis negative direction side than the second reference use area 260 r and the size in the Iy-axis direction becomes the same as the second reference use area 260 r. As shown in FIG. 10 (d), since the second use area 260 d has been thus determined, the non-superimposed mark 270 d is positioned on the Iy-axis negative direction side as compared with the reference non-superimposed mark 270 r.

Namely, as the user viewpoint position 100 detected by the viewpoint position acquisition unit 40 moves downward in the vertical direction, the image generation unit 30 positions the first use area 240 of the display area 210 to the Iy-axis negative direction side to decrease the size in the Iy-axis direction. Along with this, the superimposed mark 250 is positioned on the Iy-axis negative direction side in the display area 210 and the size in the Iy-axis direction is decreased.

Further, as the user viewpoint position 100 detected by the viewpoint position acquisition unit 40 moves downward in the vertical direction, the image generation unit 30 positions the second use area 260 of the display area 210 to the Iy-axis negative direction side. Along with this, the non-superimposed mark 270 is positioned to the Iy-axis negative direction side in the display area 210.

As described above, in the third embodiment, by determining the position and the size of the first use area 240 of the display area 210 according to the change of the user viewpoint position 100, it is possible to collectively determine display positions and display sizes of all superimposed marks 250 in the display area 210. As a result, for example, as compared with the case where a display position and a display size in the display area 210 are determined for each superimposed mark 250 when a plurality of superimposed marks 250 are displayed, the processing load of the image generation unit 30 is reduced.

Similarly, in the third embodiment, by determining the position and the size of the second use area 260 of the display area 210 according to the change of the user viewpoint position 100, it is possible to collectively determine display positions and display sizes of all non-superimposed marks 270 in the display area 210. As a result, for example, as compared with the case where a display position and a display size in the display area 210 are determined for each non-superimposed mark 270 when a plurality of non-superimposed marks 270 are displayed, the processing load of the image generation unit 30 is reduced.

In FIG. 10, although the first use area 240 and the second use area 260 are described as being arranged side by side in the Iy-axis direction, the arrangement is not necessarily limited to this. For example, the first use area 240 and the second use area 260 may be arranged side by side in the Ix-axis direction. Similarly, when viewing down the display area 210 of the image display unit 20, the first use area 240 and the second use area 260 may be arranged obliquely, and only a lower right part may be the second use area 260 and the others may be the first use area 240. However, it is preferable that the first use area 240 and the second use area 260 are arranged side by side in the Iy-axis direction or the Ix-axis direction. For example, compared with the case where the first use area 240 and the second use area 260 are arranged obliquely side by side, the image generation unit 30 is reduced in the processing load on the determination of the change in the first use area 240 and the second use area 260 in the Iy-axis direction in accordance with the change in the user viewpoint position 100 in the vertical direction.

Further, for example, the image generation unit 30 may provide an adjustment point in a generated image and define the area 240 i and the area 260 i with reference to a straight line passing through the adjustment point. In other words, the image generation unit 30 may determine the change independently in the Iy axis direction in the first use area 240 and the second use area 260 according to the change of the user viewpoint position 100 in the vertical direction with respect to the straight line passing through the adjustment point.

For example, in FIG. 11, in the example in which the first use area 240 and the second use area 260 are arranged side by side in the Iy-axis direction, in the use area 220 of the display area 210, and two area adjustment points 25 corresponding to the adjustment points provided in the image generated by the image generation unit 30 are shown. For example, as shown in FIG. 11, when there are two area adjustment points 25, a straight line passing through the area adjustment points 25 is uniquely defined. Further, for example, one pixel 22 on the display surface 21 is used as one area adjustment point 25. Further, in the example shown in FIG. 11, the straight line connecting the two area adjustment points 25 is defined on the pixel 22 having the same Iy coordinate in the display area 210.

The image generation unit 30 independently determines the change in the Iy-axis direction, for example, when the user viewpoint position 100 in the vertical direction changes on the Iy-axis positive direction side and the Iy-axis negative direction side in the use area 220 with respect to the straight line connecting the two area adjustment points 25. In other words, as shown in FIG. 11, when the first use area 240 is placed on the Iy-axis positive direction side with respect to the straight line connecting the two area adjustment points 25, the image generation unit 30 determines the position and size in the Iy-axis direction in the area on the Iy-axis positive direction side with reference to the straight line connecting the two area adjustment points 25 in the use area 220 in accordance with the change of the user viewpoint position 100 in the vertical direction. In addition, at this time, the image generation unit 30 determines the position in the Iy-axis direction of the area on the Iy-axis negative direction side based on the straight line connecting the two area adjustment points 25 in the use area 220 in accordance with the change of the user viewpoint position 100 in the vertical direction. As described above, by independently determining the change in the Iy-axis direction when the user viewpoint position 100 in the vertical direction changes to the Iy-axis positive direction side and the Iy-axis negative direction side in the use area 220 with respect to the straight line connecting the two area adjustment points 25, the image generation unit 30 can independently determine the changes in the first use area 240 and the second use area 260.

The area adjustment point 25 may be provided nearest to the Iy-axis negative direction side of the first use area 240 or nearest to the Iy-axis positive direction side of the second use area 260 or between the first use area 240 and the second use area 260. When the area adjustment point 25 is provided nearest to the Iy-axis negative direction side of the first use area 240 or nearest to the Iy-axis positive direction side of the second use area 260, the pixels 22 at the two area adjustment points 25 and on the straight line connecting the two area adjustment points 25 are considered to be used for displaying an image. When the area adjustment point 25 is provided between the first use area 240 and the second use area 260, the pixels 22 at the two area adjustment points 25 and on the straight line connecting the two area adjustment points 25 may not be used for displaying an image. Also, of course, in the use area 220, the second use area 260 may be disposed on the Iy-axis positive direction side and the first use area 240 may be disposed on the Iy-axis negative direction side.

Further, in FIG. 12, in the example in which the first use area 240 and the second use area 260 are arranged side by side in the Ix axis direction, in the use area 220 of the display area 210, and four area adjustment points 25 corresponding to adjustment points are provided in the image generated by the image generation unit 30. Specifically, two area adjustment points 25 $a$ and two area adjustment points 25 $b$ are shown. In the example shown in FIG. 12, the two area adjustment points 25 $a$ have the same Ix coordinate, and the two area adjustment points 25 $b$ have the same Ix coordinate.

The image generation unit 30 independently determines the change in the Iy-axis direction, for example, when the user viewpoint position 100 in the vertical direction changes, in the use area 220, from the straight line connecting the two area adjustment points 25 $a$ to the Ix-axis negative direction side and from the straight line connecting the two area adjustment points 25 $b$ to the Ix-axis positive direction side. In other words, as shown in FIG. 12, when the first use area 240 is disposed on the Ix-axis negative direction side from the straight line connecting the two area adjustment points 25 $a$, the image generation unit 30 determines the position and size in the Iy-axis direction in the area from the straight line connecting the two area adjustment points 25 $a$ in the use area 220 to the Ix-axis negative direction side in accordance with the change of the user viewpoint position 100 in the vertical direction. In addition, at this time, the image generation unit 30 determines the position in the Iy-axis direction in the area from the straight line connecting the two area adjustment points 25 $b$ in the use area 220 to the Ix-axis positive direction side in accordance with the change of the user viewpoint position 100 in the vertical direction. As described above, the image generation unit can independently determine the change in the first use area 240 and the second use area 260 by independently determining the change in the Iy-axis direction when the user viewpoint position 100 in the vertical direction changes from the straight line connecting the two area adjustment points 25 $a$ to the Ix-axis negative direction side and from the straight line connecting the two area adjustment points 25 $b$ to the Ix-axis positive direction side in the use area 220.

The two area adjustment points 25 $a$ may be provided nearest to the Ix-axis positive direction side of the first use area 240 or between the first use area 240 and the second use area 260 on the Ix-axis negative direction side. When the two area adjustment points 25 $a$ are provided nearest to the Ix-axis positive direction side of the first use area 240, the pixels 22 at the two area adjustment points 25 $a$ and on the straight line connecting the two area adjustment points 25 $a$ are considered to be used for displaying an image. When the two area adjustment points 25 $a$ are provided on the Ix-axis negative direction side between the first use area 240 and the second use area 260, the pixels 22 at the two area adjustment points 25 $a$ and on the straight line connecting the two area adjustment points 25 $a$ may not be used for displaying an image.

Similarly, two area adjustment points 25 $b$ may be provided nearest to the Ix-axis negative direction side of the first use area 240 or between the first use area 240 and the second use area 260 on the Ix-axis positive direction side. When the two area adjustment points 25 $a$ are provided nearest to the Ix-axis negative direction side of the first use area 240, the pixels 22 at the two area adjustment points 25 $b$ and on the straight line connecting the two area adjustment points 25 $b$ are considered to be used for displaying an image. When the two area adjustment points 25 $b$ are provided on the Ix-axis positive direction side between the first use area 240 and the second use area 260, the pixels 22 at the two area adjustment points 25 $b$ and on the straight line connecting the two area adjustment points 25 $b$ may not be used for displaying an image. Also, of course, in the use area 220, the second use area 260 may be disposed on the Ix-axis negative direction side and the first use area 240 may be disposed on the Ix-axis positive direction side.

As described above, by providing an adjustment point in a generated image, the image generation unit 30 can determine an independent change for each area divided with reference to the adjustment point according to the user viewpoint position 100 in the vertical direction. In other words, the image generation unit 30 can accurately set a boundary between the first use area 240 and the second use area 260, and can accurately determines a different change in the first use area 240 and the second use area 260 according to the user viewpoint position 100 in the vertical direction.

Further, returning to FIG. 10, FIG. 10 ($a$) shows a straight line dividing the area 240 $i$ equally into four in the iy-axis direction and a straight line dividing it equally into four in the ix-axis direction. Similarly, FIG. 10 ($a$) shows a straight line dividing the area 260 $i$ equally into two in the iy-axis direction and a straight line dividing it equally into four in the ix-axis direction. In FIG. 10 ($a$), the area 220 $i$ is divided into 24 areas by these straight lines and the outer frame of the area 220 $i$. The storage unit 32 of the image generation unit 30, for example, may store the correlation with the coordinates (Ix, Iy) on the display area 210 of the image display unit 20 for each of the coordinates (ix, iy) of all the vertices of the 24 areas. The divided areas shown in FIGS. 10 ($a$), ($b$), ($c$), and ($d$) are merely examples and do not limit the number, size, and the like of the divided areas.

Here, the front windshield 2 generally has not only a flat portion but also a curved portion. Therefore, when an image, assuming a flat surface is displayed in the display area 210 of the image display unit 20, the virtual image 330 reflected by the front windshield 2 is visually recognized by the user in a state including a distortion. Therefore, for example, correction of the distortion in accordance with the front windshield 2 may be reflected in the correlation between the coordinates (ix, iy) of all vertices of the 24 areas in the generated image stored in the storage unit 32 of the image generation unit 30 and the coordinates (Ix, Iy) on the display area 210 of the image display unit 20. In FIGS. 10 ($b$), ($c$) and ($d$), the distortion correction is not reflected.

The storage unit 32 of the image generation unit 30, for example, may store a table or an arithmetic expression, which corrects the correlation between the coordinates (ix, iy) of all the vertices of 24 areas in the generated image and the coordinates (Ix, Iy) on the display area 210 of the image display unit 20 according to the user viewpoint position 100, or may correct the correlation according to the user viewpoint position 100. The image generation unit 30, for example, may display the generated image in the display area 210, based on the correlation between the coordinates (ix, iy) of all the vertexes of 24 areas in the generated image and the coordinates (Ix, Iy) on the display area 210 of the image display unit 20, which has been corrected according to the user viewpoint position 100. In other words, based on the corrected correlation, for example, the image generation unit 30 may determine, in the display area 210, the position and size of the first use area 240 in the Iy-axis direction and the position and size of the second use area 260 in the Iy-axis direction.

Here, it is preferable that an adjustment point is provided on a boundary line between the area 240 *i* and the area 260 *i* shown in FIG. 10 (*a*). In other words, it is preferable that the adjustment line passing through the adjustment point and the boundary line between the area 240 *i* and the area 260 *i* coincide with each other. As a result, the pixel 22 on the boundary line between the first use area 240 and the second use area 260 shown in FIGS. 10 (*b*), 10 (*c*) and 10 (*d*) or the pixel 22 adjacent to the boundary line are used as the area adjustment point 25 shown in FIG. 11. Therefore, as to the distortion correction corresponding to the front windshield 2, it is possible to independently correct in the first use area 240 and the second use area 260.

The present invention is not limited to the exemplary embodiments described above and those skilled in the art will readily be able to change the above described exemplary embodiments to the extent included in the claims.

INDUSTRIAL APPLICABILITY

The head-up display of the present invention is mounted on a moving body, including, for example, a four-wheeled automobile and can be used as a display device for allowing a viewer to view a virtual image.

DESCRIPTION OF REFERENCE NUMERALS

1 Vehicle
2 Front windshield
10 Vehicle display device
20 Image display unit, Liquid crystal panel module
21 Display surface, Liquid crystal panel
30 Image generation unit
40 Viewpoint position acquisition unit
42 In-vehicle image analysis unit
50 Projection unit
60 Forward information acquisition unit
61 Forward image acquisition unit
62 Forward image analysis unit
80 Image light
100 User viewpoint position
210 Display area
220 Use area
240 First use area
250 Superimposed mark
260 Second use area
270 Non-superimposed mark
330 Virtual image
400 Superimposed distance range

The invention claimed is:

1. A vehicle display device, comprising:
a viewpoint position acquisition unit that acquires a position of a viewpoint of a user sitting in a driver seat of a vehicle;
a forward information acquisition unit that acquires forward information that is information on a forward direction of the vehicle;
an image generation unit that generates an image reflecting the forward information included in a predetermined area of the forward information acquired by the forward information acquisition unit;
an image display unit having a display surface capable of displaying the image generated by the image generation unit, and
a projection unit that projects the image toward a translucent member of the vehicle so that the user sitting in the driver seat is allowed to visually recognize a virtual image, the translucent member reflecting the image displayed on the display surface toward the user,
wherein the image generation unit adjusts a position and a size of a first image element among the image elements included in the generated image on the display surface in accordance with movement of the viewpoint position of the user in a vertical direction, the viewpoint position in the vertical direction being acquired by the viewpoint position acquisition unit,
when the viewpoint position of the user acquired by the viewpoint position acquisition unit moves upward in the vertical direction, the image generation unit adjusts the position of the first image element on the display surface so that the virtual image to be generated based partially on the first image element moves upward in the vertical direction proportionally with upward movement of the viewpoint position, and adjusts a size of the first image element so that the virtual image is enlarged in the vertical direction proportionally with the upward movement of the viewpoint position, and
when the viewpoint position of the user acquired by the viewpoint position acquisition unit moves downward in the vertical direction, the image generation unit adjusts the position of the first image element on the display surface so that the virtual image to be generated based partially on the first image element moves downward in the vertical direction proportionally with downward movement of the viewpoint position, and adjusts the size of the first image element so that the virtual image is reduced in the vertical direction proportionally with the downward movement of the viewpoint position.

2. The vehicle display device according to claim 1, wherein the image generation unit adjusts the position of displaying a second image element different from the first image element among the image elements included in the generated image on the display surface in accordance with the movement of the viewpoint position of the user in the vertical direction, acquired by the viewpoint position acquisition unit.

3. The vehicle display device according to claim 2, wherein:
when the viewpoint position of the user acquired by the viewpoint position acquisition unit moves upward in the vertical direction, the image generation unit adjusts the position of displaying the second image element on the display surface so that the virtual image to be generated based partially on the second image element moves upward in the vertical direction proportionally with upward movement of the viewpoint position, and when the viewpoint position of the user acquired by the viewpoint position acquisition unit moves downward in the vertical direction, the image generation unit adjusts the position of displaying the second image element on the display surface so that the virtual image to be generated based partially on the second image element moves downward in the vertical direction proportionally with downward movement of the viewpoint position.

4. The vehicle display device according to claim 3, wherein:
   the display surface of the image display unit includes at least a first use area used for displaying the first image element and a second use area used for displaying the second image element,
   the image generation unit determines the position and the size of the first image element on the display surface by determining the position and size of the first use area in accordance with the position of the viewpoint of the user in the vertical direction acquired by the viewpoint position acquisition unit, and
   the image generation unit determines the position and the size of the second image element on the display surface by determining the position and size of the second use area in accordance with the position of the viewpoint of the user in the vertical direction acquired by the viewpoint position acquisition unit.

5. The vehicle display device according to claim 2, wherein:
   the display surface of the image display unit includes at least a first use area used for displaying the first image element and a second use area used for displaying the second image element,
   the image generation unit determines the position and the size of the first image element on the display surface by determining the position and size of the first use area in accordance with the position of the viewpoint of the user in the vertical direction acquired by the viewpoint position acquisition unit, and
   the image generation unit determines the position and the size of the second image element on the display surface by determining the position and size of the second use area in accordance with the position of the viewpoint of the user in the vertical direction acquired by the viewpoint position acquisition unit.

6. The vehicle display device according to claim 5, wherein the first use area and the second use area are arranged on the display surface side by side in a direction corresponding to the vertical direction or a direction corresponding to a left and right direction of the vehicle.

7. The vehicle display device according to claim 1, wherein the image generation unit adjusts the position and the size of the first image element on the display surface while a range of distance on a road surface of a scene, on which the virtual image related to the first image element is superimposed, in scenery seen by the user through the translucent member, is maintained constant without being influenced by a change in the viewpoint position of the user in the vertical direction.

8. The vehicle display device according to claim 1, wherein the image generation unit adjusts the position of displaying a second image element different from the first image element among the image elements included in the generated image on the display surface in accordance with the movement of the viewpoint position of the user in the vertical direction acquired by the viewpoint position acquisition unit.

9. A vehicle display device, comprising:
   a viewpoint position acquisition unit that acquires a position of a viewpoint of a user sitting in a driver seat of a vehicle;
   a forward information acquisition unit that acquires forward information that is information on a forward direction of the vehicle;
   an image generation unit that generates an image reflecting the forward information included in a predetermined area of the forward information acquired by the forward information acquisition unit;
   an image display unit having a display surface capable of displaying the image generated by the image generation unit, and
   a projection unit that projects the image toward a translucent member of the vehicle so that the user sitting in the driver seat is allowed to visually recognize a virtual image, the translucent member reflecting the image displayed on the display surface toward the user,
   wherein the image generation unit adjusts a position and a size of a first image element among the image elements included in the generated image on the display surface in accordance with movement of the viewpoint position of the user in a vertical direction, the viewpoint position in the vertical direction being acquired by the viewpoint position acquisition unit, and
   the image generation unit adjusts the position and the size of the first image element on the display surface while a range of distance on a road surface of a scene, on which the virtual image related to the first image element is superimposed, in scenery seen by the user through the translucent member, is maintained constant without being influenced by the movement of the viewpoint position of the user in the vertical direction.

10. The vehicle display device according to claim 9, wherein the image generation unit adjusts the position of displaying a second image element different from the first image element among the image elements included in the generated image on the display surface in accordance with the movement of the viewpoint position of the user in the vertical direction acquired by the viewpoint position acquisition unit.

* * * * *